United States Patent [19]

Romao et al.

[11] Patent Number: 4,594,609
[45] Date of Patent: Jun. 10, 1986

[54] SCRAMBLING SYSTEM FOR TELEVISION VIDEO SIGNAL

[75] Inventors: Nuno Romao, Scarborough; Ivica Mudrinic, Weston, both of Canada

[73] Assignee: Viewstar Inc., Scarborough, Canada

[21] Appl. No.: 509,765

[22] Filed: Jun. 30, 1983

[51] Int. Cl.⁴ .............................................. H04N 7/167
[52] U.S. Cl. ..................................... 358/119; 358/120
[58] Field of Search ........................ 358/120, 119, 114

[56] References Cited

U.S. PATENT DOCUMENTS

| | | |
|---|---|---|
| 2,912,486 | 11/1959 | Shanahan. |
| 4,222,068 | 9/1980 | Thompson ......................... 358/120 |
| 4,458,268 | 7/1984 | Ciciora ............................... 358/119 |

FOREIGN PATENT DOCUMENTS

| | | | |
|---|---|---|---|
| 1150818 | 4/1983 | Canada ................................. | 350/26 |
| 2947943 | 6/1980 | Fed. Rep. of Germany. | |
| 1001441 | 8/1965 | United Kingdom. | |

*Primary Examiner*—S. C. Buczinski
*Assistant Examiner*—Melissa Koltak

[57] ABSTRACT

A method and apparatus for scrambling a composite television signal and method and apparatus for unscrambling of the scrambled television signal are disclosed in the present application. The method of scrambling shifts at least some lines of video information relative to adjacent (preceding or subsequent) lines of video information according to a predetermined scheme, and deletes at least some portions of the signal which comprise synchronization or control information of a known or predetermined repetitive form from between at least some of the adjacent shifted lines of video information. The method of unscrambling applies a complementary shift to return the video information into proper time spacing and includes the insertion of any necessary synchronization information eliminated from the signal during scrambling. Timing information allows the unscrambler to reverse the scrambling operation and thereafter insert any necessary synchronization information. This scrambling technique maitaining at least essentially all of the video information thereby allowing faithful reproduction on a television. The system in addition to being secure, is compatible with communication channels used to distribute television signals and the apparatus for unscrambling the signal is relatively inexpensive and reliable.

145 Claims, 14 Drawing Figures

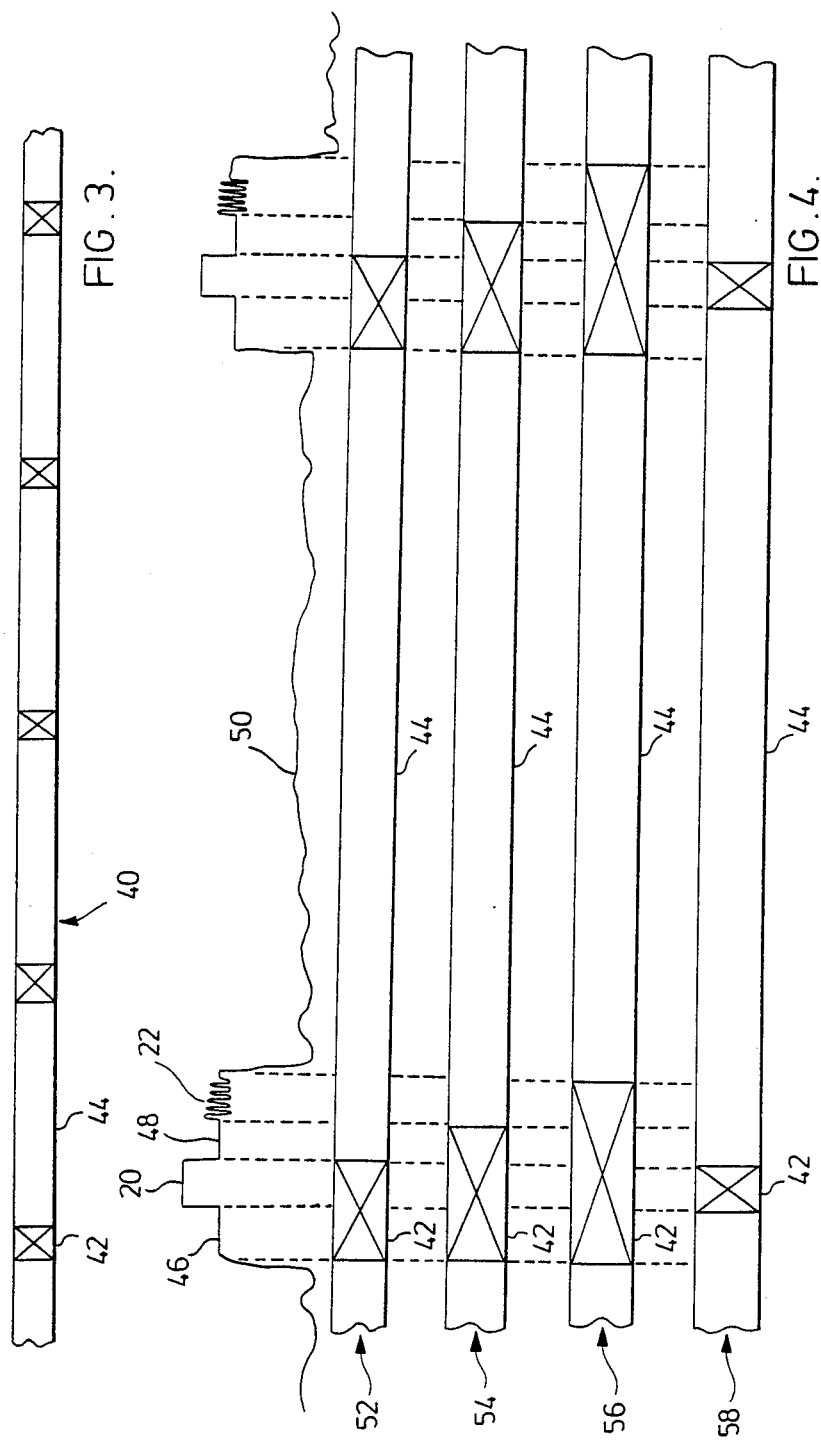

SCRAMBLING SYSTEM FOR TELEVISION VIDEO SIGNAL

FIELD OF THE INVENTION

This invention relates to a method and apparatus for scrambling a composite television signal and a method and apparatus for unscrambling the scrambled signal. The scrambling method shifts in time, according to a predetermined scheme, some portions of the composite television in a manner to eliminate at least a portion of the signal at least between some adjacent (preceding or subsequent) lines of video information which need not be transmitted to substantially allow on unscrambling faithful reproduction of the original signal. In the preferred form, horizontal synchronization information, including horizontal synchronization pulses is eliminated by shifting in time lines of video information. This eliminated information is of a known or predetermined form and as such can be created and inserted as necessary during unscrambling of the signal. The method of unscrambling employs a scheme determined by the predetermined scheme of scrambling to shift, in accordance with timing information lines of video information to return them to the order and spacing as found in the original signal and the insertion of necessary synchronization information whereby the unscrambled signal is substantially a faithful reproduction of the original composite signal. The shifting of lines of video and the insertion of created information requires the scrambler and unscrambler to be linked in time and the unscrambler knows of or is given information indicative of the predetermined scheme of scrambling. The timing information can be transmitted separately, however, it is preferably encoded in the signal.

BACKGROUND OF THE INVENTION

Methods of scrambling composite television signals in a manner to allow subsequent unscrambling have been proposed and a number of these methods are in use. A number of these prior art systems are exemplified in U.S. Pat. No. 3,106,604, U.S. Pat. No. 3,538,243, U.S. Pat. No. 3,147,061 and U.S. Pat. No. 2,619,530. The most basic of the scrambling techniques have used what is referred to as synchronization suppression or synchronization inversion which basically alters the horizontal synchronization pulse in a manner so that a television set will not recognize it thereby resulting in the signal being unacceptable for reproduction on the television. Although this technique works quite well, a person wishing to pirate the signal can easily identify the scrambling technique and produce an apparatus which will correct the signal such that it is acceptable for the television. Because of this, more complicated scrambling techniques have been proposed which would include line inversion and line shuffling.

Line inversion is a fairly good technique to stop a would-be pirate in that a line of video information can be inverted about a particular axis and it is more difficult for the pirate to reverse this process as he must recognize what lines have been inverted and about what axis they have been inverted. Although this techniqueworks satisfactorily on a lab bench it has proven difficult to maintain the quality of the signal in practise. This is primarily due to the nature of communication channels used by cable companies which introduce noise during transmission adversely effecting the signal decreasing the precision possible upon unscrambling of the signal.

Line shuffling is another known more sophisticated technique which stores complete lines of video information including all the synchronization information, to alter the transmission sequence of lines of video information. The unscrambler then reverses this operation as it has knowledge of the method of scrambling. In order to be effective many lines should be scrambled and the separation or the shuffling should be a minimum of about 6 lines. This increases the cost of the unscrambling unit as it must be capable of storing lines equal to the maximum separation.

Other methods of scrambling television signals have been proposed altering the time relation between horizontal synchronization information and video information.

Systems of this type generally only cause limited horizontal shearing. Systems of the type mentioned above as well as other scrambling systems and devices are disclosed in U.S. Pat. Nos. 3,244,806, 3,732,355, 2,972,009 and 2,758,153.

There still remains a need to provide a scrambling method which is sufficiently sophisticated to prevent would-be pirates while providing a method which does not result in the degradation of the signal due to transmission through the known communication channels. In addition the scrambling technique must be simple enough to allow a low cost reliable unscrambler unit as for any given scrambling system there will be a very large number of unscrambling units which are used by subscribers.

SUMMARY OF THE INVENTION

The method and apparatus of scrambling a composite television signal and method and apparatus of unscrambling thereof, recognize that the composite signal has intervals of unique video information and intervals of synchronization information of a known or predetermined repetitive form used to control the display of the video information. The synchronization information because of its known or predetermined repetitive form can be created in an unscrambler and appropriately inserted given that the scrambler and unscrambler are linked in time. Recognizing the above, it is then possible to substantially shift adjacent, preceding or subsequent, video information to decrease the time duration therebetween as at least some of the synchronization information is eliminated, which due to its known or predetermined repetitive form can be created and inserted during unscrambling to allow substantially faithful reproduction of the composite signal.

According to the present invention, a method of scrambling a composite television signal having intervals containing video information separated by intervals containing synchronization information necessary for faithful reproduction by a television and of a known or predetermined repetitive form comprises processing the signal to eliminate at least some of the synchronization information necessary for faithful reproduction by a television between adjacent video information and shifting such adjacent video information to decrease the time duration therebetween by a duration substantially equal to the duration of the eliminated necessary synchronization information, which, due to its known or predetermined repetitive form can be created and inserted during unscrambling as required to allow substantially faithful reproduction of the composite signal.

According to a preferred form of the invention, the method of scrambling a composite television video signal having intervals containing video information separated by horizontal synchronization pulses comprises shifting in time according to a predetermined scheme, at least some portions of the composite television signal in a manner to eliminate at least some horizontal synchronization pulses between adjacent intervals of video information.

According to an aspect of the invention the method of scrambling a composite television video signal, having a sequence of intervals containing video information separated by intervals containing horizontal synchronization information necessary for reception by television, comprises processing the composite television signal to provide a scrambled television signal containing essentially all the video information of the composite television signal and omitting at least some of the horizontal synchronization information of a composite television signal necessary for reception. At least some of the intervals containing video information in the scrambled television signal are separated by intervals having a duration less than the duration of the intervals separating the intervals containing video information of the composite television signal. More particularly the signal is processed by shifting in time according to a predetermined scheme at least some portions of the composite television signal, the shifting being controlled to allow the scrambled television signal to be subsequently reprocessed to provide a signal substantially corresponding to the composite television signal. The method also provides timing information used during the unscrambling of the signal.

According to a preferred form of the invention the time difference between the duration each portion is shifted and zero or the duration at least another portion is shifted is essentially equal to the duration of a front porch and a horizontal synchronization pulse of the composite television signal.

According to a further feature of the invention a method of scrambling a composite television video signal having a sequence of augmented picture portions, defined as a line of video information, a colour burst, and a back porch, with these augmented picture portions separated by intervals having a front porch and a horizontal synchronization pulse, comprises processing the composite television signal to produce a scrambled television signal containing essentially all the augmented picture portions of the composite television signal and omitting at least some of the horizontal synchronization pulses of the composite television signal. Some of the augmented picture portions in the scrambled television signal are separated by intervals having a duration less than the duration of the intervals separating the augmented picture portions of the composite video signal. The signals are processed by shifting in time according to a predetermined scheme at least some portions of the augmented picture portions of the composite television signal and wherein said step of shifting is controlled to allow said scrambled television signal to be subsequently processed to provide a signal substantially corresponding to the composite television video signal. Preferably, timing information used during the unscrambling of the signal is encoded in the scrambled signal.

A method of unscrambling, according to the present invention, unscrambles a scrambled composite television video signal wherein a number of lines of video information have been shifted according to a predetermined scheme to decrease the time duration between at least some adjacent lines of video information by an amount at least equal to the duration of a horizontal synchronization pulse thereby eliminating a substantial portion of the signal between adjacent lines of video information. The method comprises receiving the scrambled television signal, receiving timing information associated with the scrambled signal, shifting in time according to a scheme determined by the predetermined scheme of scrambling and in accordance with the timing information, at least some adjacent lines of video information to re-establish the time duration between adjacent lines of video information to that as essentially found in the original television signal. In the preferred form of scrambling, essentially all of the horizontal synchronization information other than the colour bursts is eliminated and the method of unscrambling creates and inserts in accordance with the timing information horizontal synchronization information between adjacent lines of video information eliminated during scrambling of the signal.

According to a preferred form of the method of unscrambling, the method includes receiving periodically injected control signals to determine a scheme determined by the predetermined scheme of scrambling, for shifting portions of the scrambled signal to produce an unscrambled television signal having the same spacing between lines of video information as found in the original signal.

The method, according to the present invention, of scrambling a composite television video signal recognizes that there is a substantial portion of the signal devoted to synchronization information of predetermined repetitive form which is used to control the display of video information on a television screen, and this portion need not be transmitted to allow substantially faithful reproduction of the composite signal upon unscrambling. This predetermined repetitive form of the signal can be omitted and the time duration thereof advantageously used to substantially alter the time relation between adjacent lines of video information in a predetermined manner to provide a first form of scrambling which renders the signal unsuitable for reception by a television. It is to be noted that the omitted information is normally necessary to allow the video information to be properly displayed, however it can be created in the unscrambler due to its known or predetermined form.

In addition, the scrambling technique is preferrably enhanced by eliminating at least some of the remaining synchronization information between adjacent lines of video information where the time duration has been increased, to further change the characteristics of the scrambled signal. In addition an extraneous signal, preferrably extraneous video information, is introduced in at least some of the gaps between adjacent lines of video information to further mask the location of video information which is to be displaced on the television screen.

According to a preferred form of the method of scrambling, substantially all of the horizontal synchronization information other than the colour bursts in the signal between vertical blanking intervals is eliminated from the transmitted signal and extraneous video information is introduced in any time gaps between lines of video information which remain after shifting of video information.

BRIEF DESCRIPTION OF THE DRAWINGS

Preferred embodiments of the invention are found in the drawings wherein:

FIG. 3 is a schematic representaton of a portion of a composite television signal broken into video line segments and horizontal synchronization segments;

FIG. 4 is a diagrammatic representaton setting forth various definitions used in the disclosure;

DETAILED DESCRIPTION OF PREFERRED EMBODIMENTS

Figure 1:
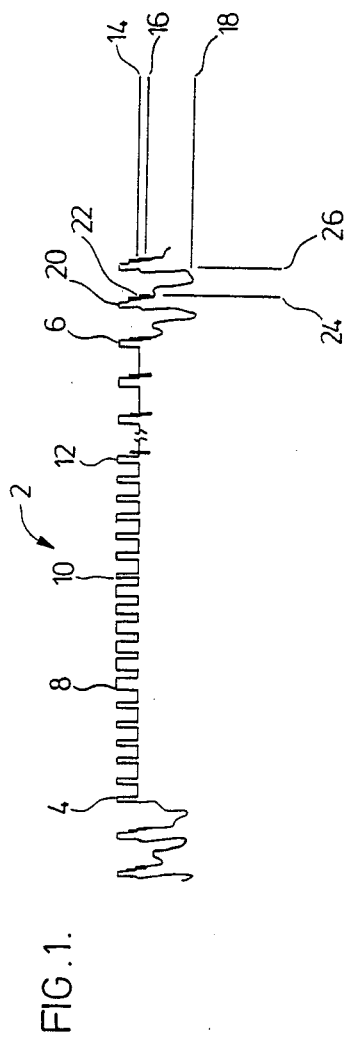
FIG. 1 is a schematic illustration of a composite television signal.

With reference to FIG. 1, a portion of a composite television video signal is generally shown at 2. The vertical blanking interval commencing at time 4 and terminating at time 6 appears once in each field, or twice in each frame, of a composite television video signal and contains an equalizing pulse interval from times 4 to 8. Thereafter, follows a vertical synchronization pulse interval from times 8 to 10, followed by another equalizing pulse interval from times 10 to 12. Reference level 14 is the blanking level and the grey level of the composite television video signal extends between the reference black level 16 and the reference white level 18. This vertical blanking interval is of a predetermined repetitive form which is used to control the display of video information on a television screen.

Figure 2:
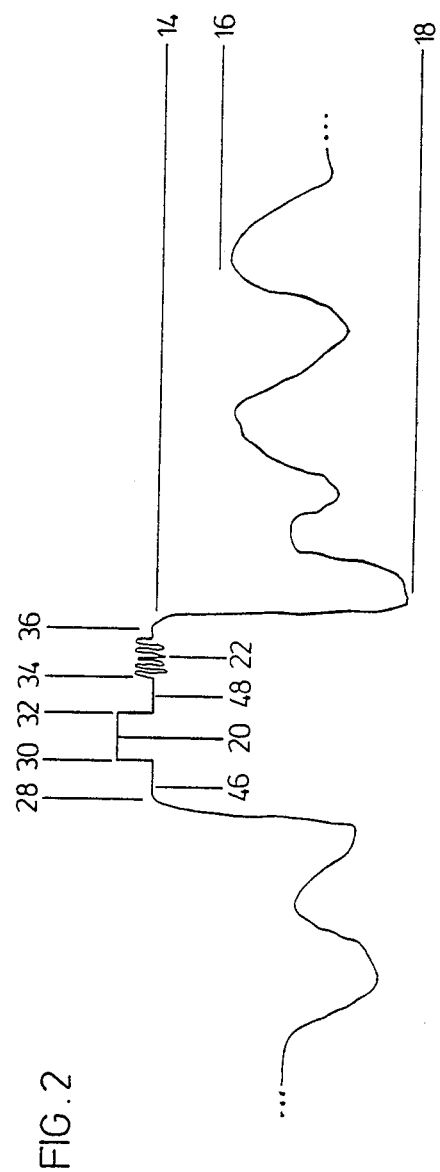
FIG. 2 is a schematic representation of the portion of a composite television signal between two adjacent lines of video information.

Following each vertical blanking interval of the composite television video signal is a sequence of lines of video information, one of which is designated as commencing at time 24 and terminating at time 26, separated by intervals containing, among other things, horizontal synchronization information necessary for reception by a standard television and of a known or predetermined form. With reference to FIG. 2, the information contained in the interval separating adjacent lines of video information is shown in greater detail. The interval includes a front porch 46 commencing at time 28 and terminating at time 30, followed by a horizontal synchronization pulse 20 terminating at time 32. Following the horizontal synchronization pulse is the backporch 48 commencing at time 32 and terminating at time 34, followed thereafter by a colour burst portion 22 terminating at time 36. However, a composite black and white television video signal does not include the colour burst portion. In the case of a composite colour television signal the colour burst portion 22 is necessary to accurately determine the phase of a frequency generator in the television receiver used in the extraction of the chrominance information contained in the following line of video information. The horizontal synchronization pulse 20 is required by a standard television in order to determine accurately the timing of the subsequent line of video information and to maintain the horizontal sweep generator in proper synchronization. As shown in FIG. 1, the synchronization information, which could include the colour burst, is located between adjacent lines of video information and is of a predetermined repetitive form used to accurately display the video information on a television screen.

Thus, the composite television video signal includes at least two distinct portions, these being:

1. video information for displaying on a television screen, and
2. other information used by a television to control the display of the video information.

The video information is unique, however, the other information is of a known or predetermined repetitive form which can be created in an unscrambler.

The duration of the intervals separating adjacent lines of video information in the composite television video signal are essentially equal to one another and have a duration of approximately 11.1 microseconds. The sum of the durations of a front porch, horizontal synchronization pulse, back porch, colour burst portion and the following line of video information is approximately 63.5 microseconds. The sum of the duration of a front porch and horizontal synchronization pulse is approximately 6.35 microseconds and the duration of a horizontal synchronization pulse is approximately 4.6 microseconds.

In this disclosure and the appended claims reference is sometimes made to a composite television signal suitable for reception by a television. It should be understood that when such a reference is made no differentiation is intended between a base-band television signal and a radio frequency modulated version thereof for the purpose of the suitability of the television signal for reception by a television. The context in which the reference is made will be clearly obvious and when the context of the specification noteably calls for differentiation, same will be made.

With reference to FIG. 3, a portion of a composite television video signal is diagramatically shown generally at 40 having a sequence of intervals 44 containing video information separated by intervals 42 containing horizontal synchronization information necessary for reception by a standard television receiver.

With reference to FIG. 4, a portion of a composite television video signal having a front porch 46, a horizontal synchronization pulse 20, a back porch 48, a colour burst portion 22 and a line of video information 50 is shown. The diagramatic portions generally designated as 52, 54, 56 and 58 show four of the possible definitions of intervals containing video information. In the case of the portion designated generally 52 it is seen that the interval 44 containing video information includes also the back porch and colour burst portion of the composite television video signal. For the purpose of this specification this interval shall sometimes be referred to as the augmented picture portion. The time relationship between the colour burst and the subsequent line of video information preferrably should not be disturbed by the scrambling technique as described hereinbelow since the time relationship is required for the extraction of the chrominance information in the subsequent line of video information. With reference to the portion generally designated as 54, it is seen that the interval 44 containing video information includes just the colour burst portion and the subsequent line of video information. With reference to the portion generally designated as 56, it is seen that the interval 44 containing video information contains only the line of video information. Finally, as generally designated in portion 58 the interval 44 containing video information may also be defined so as to include the front porch in addition to the back porch, colour burst portion and line of video information. The intervals 42 and 44 may have many other possible definitions and the prior four examples are illustrative of just some of the possibilities. For instance, the division between the intervals 42 and 44 may occur at times other than exact times 32, 34, 36 or 30 shown in FIG. 2. In practice, however, it has been found desirable to employ the intervals defined as aforesaid since reconstruction of the scrambled television signal to produce a signal suitable for reception by television involves the "splicing" of the different intervals and same can be most easily accomplished at the particular edges occurring at times 30, 32, 34 or 36.

Figure 5:
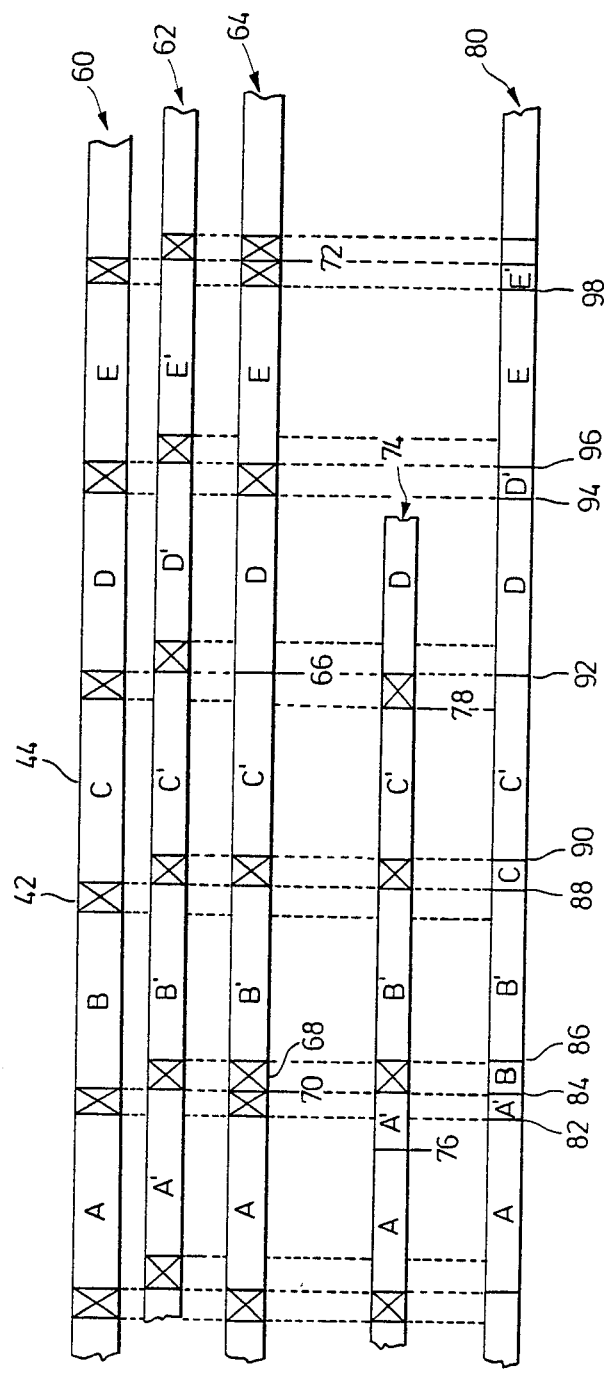
FIG. 5 diagrammatically represents a portion of a composite television signal and various delayed versions of the composite television signal and various scrambled versions of the composite television signal.

With reference to FIG. 5, a portion of a composite television video signal having intervals 44 containing video information separated by intervals 42 containing horizontal synchronization information necessary for reception by a television is shown generally at 60. For reference purposes the intervals 44 containing video information are labelled A through E. Shown generally at 62 is a portion of a composite television signal corresponding to the portion of the composite television signal shown generally at 60 but shifted in time relative thereto by a delay equal to the duration of the interval 42. Intervals containing video information in the shifted portion of the composite television signal are labelled A' through E' for reference purposes. Shown generally at 64 is a portion of a scrambled television signal which has been produced by shifting in time according to a predetermined scheme some portions of the composite television signal 60 in a manner to eliminate at least some horizontal synchronization pulses while maintaining all of the video information of the composite television signal. At other points, for example about time 70 two intervals containing horizontal synchronization information are present. In particular, the interval A in the scrambled television video signal has been derived from the interval A in the composite television signal 60 whereas the interval B' in the scrambled television video signal has been derived by shifting a portion of the composite television signal, namely B. For reference purposes, the interval B' may be considered as a direct copy, with respect to time, of the interval B' in signal 62. The remaining intervals C', D and E are similarily derived from portions of the composite television signal 60, with the interval C' being a shifted version of the interval C in signal 60.

In the scrambled television signal 64, at time 66, an interval 42 containing horizontal synchronization information normally necessary for reception is eliminated. However, the scrambled television signal 64 contains all of the video information of the composite television video signal 60 with some portions thereof being displaced in time relative to others as compared to the composite television signal 60. It should, however, be appreciated that it is not essential to this invention that all of the video information in the composite television signal appear in the scrambled television signal, as long as care is exercised in the omitting of certain portions, such that it is still possible to reconstruct a signal which substantially corresponds to the composite television signal. For example it is possible to delete the last two lines of video information in any field without appreciably effecting the quality of the signal. It is also possible to delete some trailing portions of the video signal without seriously effecting the signal. Furtheremore on occasion an entire line of video information can be deleted. At period of time 68 in the scrambled television signal 64 an extra interval containing synchronization information is shown. In general, the scrambled television signal 64 has some adjacent intervals containing video information which are separated by periods of time different than in the composite television signal 60. In particular, intervals A and B' in the scrambled television signal 64 are separated by a period of time greater than the intervals A and B in the composite television signal 60 from which they were derived, whereas intervals C' and D are separated by an interval of duration zero. In this way adjacent lines of video information are shifted to eliminate horizontal synchronization information and at a different point in the scrambled signal extraneous information is introduced. For example a television signal 80 has extraneous video information A', B, C, D' and E' at least some of which are in place of horizontal synchronization information. This makes it more difficult for a would be pirate to determine the extent to which video information has been shifted. With respect to signal 64 extraneous information would be the first interval 42 at times 70 and 72.

Appropriately radio frequency modulated versions of the scrambled television signal 64 could not be properly received by a standard television. The shifting of some portions of the composite television signal to produce the scrambled television signal has altered both the regular periodic occurrence of intervals 42 containing synchronization information necessary for reception by a television and the relative timing between at least some intervals containing video information. Further, at least some of the intervals containing horizontal synchronization information, and in particular at least some horizontal synchronization pulses, are elemuinated. This factor alone makes it very difficult to unscramble the scrambled television signal without knowledge, resulting from proper authorization, of the particular mode in which the composite television signal was scrambled. The first factor will make it virtually impossible for the horizontal synchronization generator of a standard television to lock onto the horizontal synchronization pulse. The second factor will cause a horizontal shearing of the video information displayed on the cathode ray tube of the television receiver assuming the horizontal synchronization generator in the receiver of television could possibly lock onto the irregular arrivals of the horizontal synchronization pulses. The elimination of at least some horizontal synchronization pulses will further thwart the seeking of the horizontal synchronization generator in the receiver of a television and when all of the horizontal synchronization information in the scrambled television signal is omitted the said generator will be at a complete loss.

Further details by which the scrambled television signal 64 is produced are as follows. For the period of time up to time 70 the composite television signal 60 is selected. Thereafter, a shifted portion of the composite television signal 60, namely intervals B and C are selected up to time 66. This selection may also be viewed as selections of intervals B' and C' of signal 62. Thereafter, the intervals D and E in the composite television signal 60 are selected up to time 72. Thereafter, the shifted television signal 62 may be viewed as being selected. It will be appreciated that either signal 60 or 62 may be viewed as being selected according to any desired scheme of scrambling. However, in order that the scrambled television signal may be subsequently unscrambled the scheme in which the signals 60 and 62 are selected should be predetermined. There are many predetermined schemes that may be used and one possibility involves the use of a pseudo random number generator which is initiated by a particular starting kernel which may be varied from time to time. This starting kernel may be encoded into the scrambled television signal in the form of digital control signals and, further, a starting signal representing the commencement of the predetermined scheme for reception and use by an unscrambling device may also be encoded.

In the example discussed thus far the times at which changes from one of the selected signals 60 or 62 to the other signal occurred outside the time period in which an interval containing video information in the scrambled television signal was being derived and therefore produced a scrambled television signal having each interval containing video information being continuous and non-interrupted. With reference to the signal generally shown as 74 the change from selected signal 60 to 62 occurs at time 76. A further change from selected signal 62 to selected signal 60 occurs at time 78. It is noted that the change at time 78 has caused the deletion of the trailing portion of the interval C' containing video information. If the scrambled signal 74 was attempted to be unscrambled, the eliminated trailing portion would not be recovered. Although, as previously mentioned, the elimination of certain relatively small portions of the video information of the composite television signal 60 will not seriously impair the video information displayed on the cathode ray tube of the receiver's television, as a general rule changes in the selected signal should not be made that cause the elimination of portions of the video information. With respect to the shifting of the video information of signal 60, or in otherwords the change of selected signals 60 and 62, that occurred at time 76 no video information is eliminated. However, on reconstruction of the signal 74 a transition must be made pending the occurrence of the video information that will ultimately appear on the cathode ray tube of the receiver's television. The "glitch" from such a transition must either be eliminated or tolerated as a visual impairment. Therefore, it is the preferred method of this invention that each interval containing video information in the scrambled television signal be derived from only one interval containing video information in the composite television signal thereby producing continuous and uninterrupted intervals containing video information in the scrambled television signal. However, it is noted that transitions as shown in signal 74 at times 76 and 78 are within the contemplation of this invention.

With reference to the scrambled television signal shown generally as 80, the step of selecting has been controlled such that no intervals 42 containing horizontal synchronization information necessary for reception are selected and appear in the scrambled television signal. Therefore, the scrambled television signal shown generally at 80 contains no horizontal synchronization information necessary for reception, and in particular, contains no horizontal synchronization pulses. To achieve this result, following the derivation of the end of each interval containing video information in the scrambled television signal a different signal is selected for a period of time. By way of example, such different selections are shown at times 82, 88, 92, 94 and 98. The period of time for which the different signal is selected is equal to the duration of an interval separating intervals containing video information in the composite television signal when the next selected signal containing an interval containing video information is the same as the past selected signal. This is shown in the intervals between times 88 and 90 and between times 94 and 96. In the transition shown at time 92 the signal 60 is selected for a period of time equal to the duration of the interval containing video information so that a complete line of video information may be derived.

Multiple selections of signals are made when the next selected signal containing an interval containing video information is delayed relative to the last selected interval. This is shown at times 82, 84 and 86. With the step of selecting controlled in the aforesaid manner, the intervals between intervals containing video information in the scrambled television signal will contain the leading and trailing portions of the intervals containing video information in the composite television signals. This extraneous video information in the scrambled television signal further thwarts a would-be pirate who seeks to unscramble the scrambled television signal on his own accord without authorization.

In the preferred method of scrambling the colour burst portion is shifted with the subsequent line of video information. The colour burst portion is at the blanking level which is blacker than the black level. As such, it is possible for a would-be pirate to look for the colour burst portion at the blanking level in order to provide a clue as to how the television signal was scrambled. If desired, the colour burst portion may be shifted by a DC bias factor to the grey level thereby making them virtually indistinguishable from the video information. Such bias shifting does not disturb the time relationship critical for the extraction of chrominance information between the colour burst portion and the subsequent line of video information and at each unscrambling unit the colour burst portion would simply be shifted back up to the normal blanking level for subsequent use by a standard television receiver.

It is also possible to insert a signal containing digital data at the end of at least some of the intervals containing video information in order to establish a digital communication channel with the unscrambling devices.

The amount a portion of the composite television signal is shifted is not restricted to one value and in general, subject to certain limitations discussed below, any amount of shifting of the composite television signal is permissable.

Figure 6:
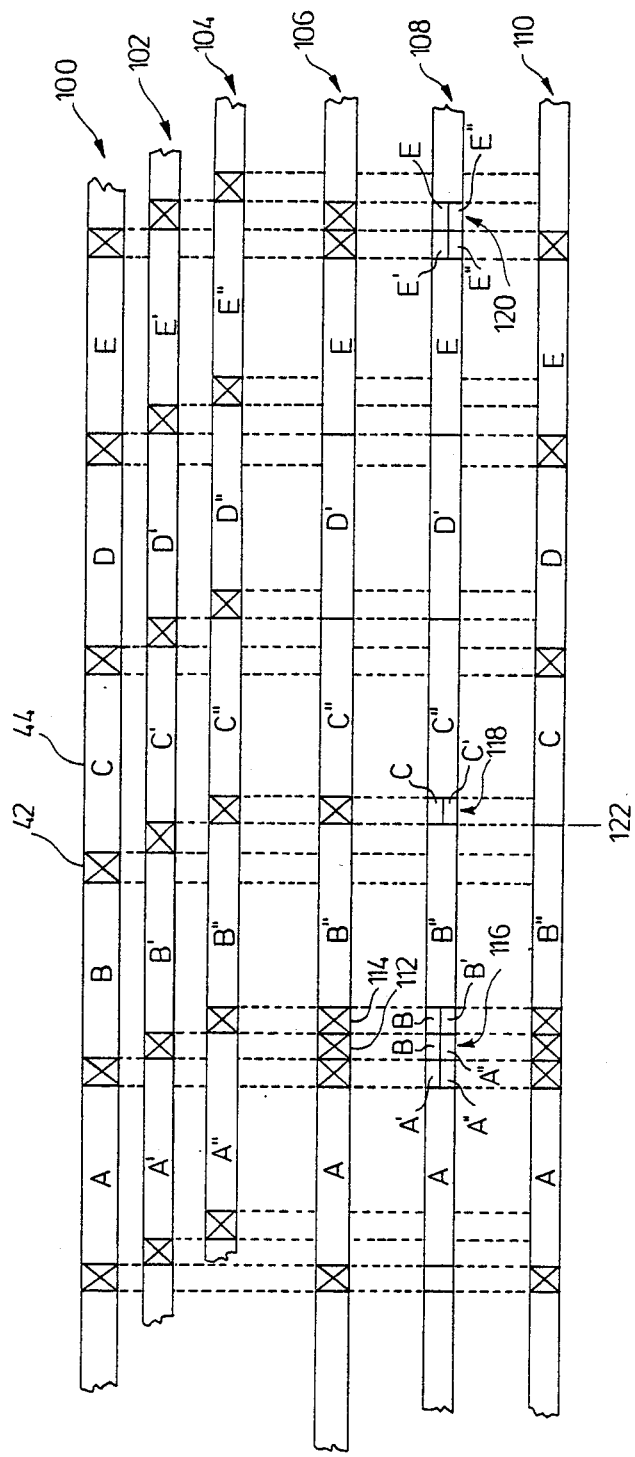
FIG. 6 is a diagrammatic representation similar to FIG. 5 showing further methods of scrambling.

With reference to FIG. 6, a composite television video signal is shown generally at 100 having a sequence of intervals 44 containing video information separated by intervals 42 containing horizontal synchronization information necessary for reception. The intervals containing video information are referenced by the letters A through E. Two delayed versions of the signal 100 are generally shown at 102 and 104 and are delayed relative to the signal 100 by one times and two times the duration of the interval 42 containing the horizontal synchronization information necessary for reception respectively. The signals 102 and 104 have intervals containing video information designated respectively as A' through E' and A" through E". A scrambled television signal shown generally at 106 is produced from the signal 100 by having portions thereof shifted in time according to a predetermined scheme. At periods of times 112 and 114 extra intervals containing synchronization information are present. In general, the maximum duration of any interval separating intervals containing video information in the scrambled television signal will be equal to an individual one of the duration of the intervals containing synchronization information necessary for reception in the composite television signal plus the maximum amount of time by which the selected signals are shifted relative to one another. In general, therefore, intervals containing video information can be separated by any amount in the scrambled television signal and, in fact, with sufficient shifting of the composite television signal it is possible to change the order in which the sequence of intervals containing video information in the scrambled signal appear.

With reference to the scrambled signal shown generally at 108 in FIG. 6, the selecting has been controlled such that the scrambled television signal does not contain any intervals containing horizontal synchronization information necessary for reception. As shown generally at periods of time 116, 118 and 120 the signals that may be selected following the end of each interval containing video information in a scrambled television signal are not unique. In general, in order to introduce portions containing extraneous video information in the scrambled television signal there will be the option of selecting from among a number of signals equal to one less than the number of signals that may be selected to produce the scrambled television signal assuming each of the signals to be selected is separated from one another by a duration greater than or equal to the duration of the intervals separating intervals containing video information in the composite television signal and assuming that the selected signals do not have synchronization information at the same time as signal being transmitted.

With reference to the scrambled television signal shown generally at 110, a transition from selected signal 104, which is shifted in time relative to signal 100 by a duration equal to two times the duration of interval 42, to signal 100 occurs at time 122 which causes the elimination of the leading portion of interval C. This eliminated information cannot be recovered when the signal 110 is unscrambled. In general, therefore, in order to prevent such elimination of video information, the step of selection should be controlled such that no signal is selected for the derivation of an interval containing video information which is advanced in time relative to the prior selected signal from which an interval containing video information was derived by an amount greater than the duration separating intervals containing video information in the composite television signal. This follows, since selecting a signal advanced in time relative to the prior selected signal eliminates a portion of the scrambled television signal of duration equal to the time difference between the two selected signals. It is noted, of course, that the duration of the portions of the composite television signal that may be eliminated, subject to the limitations discussed above, is equal to duration of an interval separating intervals containing video information of the composite television signal. On the other hand, there is no prohibition respecting the selection of signals which are delayed in time relative to the prior selected signal since such a selection merely increases the duration separating intervals containing the video information used to produce the unscrambled signal.

Figure 7:
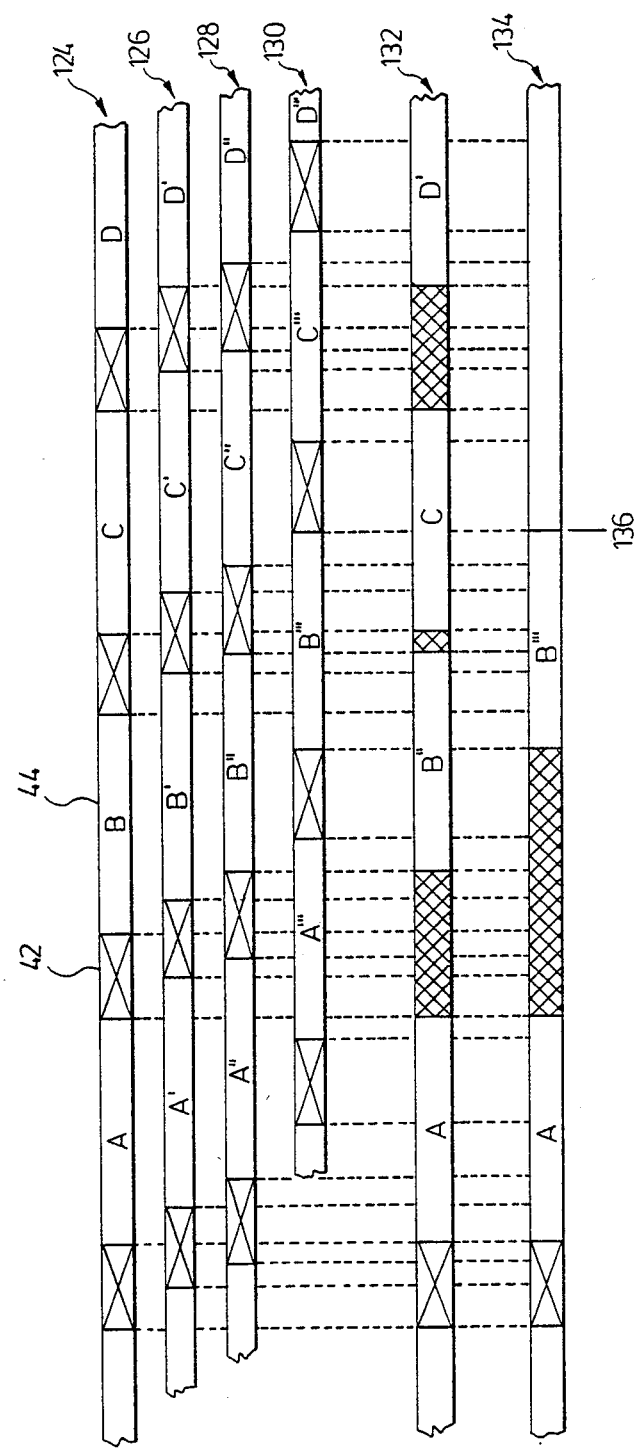
FIG. 7 is a diagrammatic representation of further scrambling techniques.

Although in the prior examples shown in FIGS. 5 and 6 the portions of the signals appearing in the scrambled television signal had been shifted relative to the composite television signal by an integer multiple of the duration of the interval containing horizontal synchronization information necessary for reception, in general, there is no need for such a relationship. With reference to FIG. 7, a composite television video signal is shown generally at 124 having intervals 44 containing video information separated by intervals 42 containing horizontal synchronization information necessary for reception. Shown generally at 126 and 128, are versions of the signal 124 shifted relative to the signal 124 by an amount equal to a fraction of the duration of the interval 42. Shown generally at 132, is a scrambled television signal formed by shifting portions of the signal 124, or viewed another way, as selections of signals 124, 126 and 128. In this scrambled signal the duration of the intervals separating intervals containing video information are not merely integer multiples of the duration of the interval 42. In general, subject to the limitations discussed herein, the only requirement is that the time average of the duration of the intervals separating the intervals containing video information in the scrambled signal approach the time average of the duration of the intervals separating intervals containing video information in the composite television signal as time approaches infinity. Stated another way, the duration of the inserted intervals must equal the duration of eliminated intervals as time approaches infinity. However, in this general case it will be appreciated that the scrambled television signal could encroach upon the vertical blanking interval of the scrambled television signal. It may be desired to prevent this occurring if the vertical blanking interval is to be preserved in its state as it is found in the composite television signal so that the scrambled television signal will be compatible with certain communication protocols that use the vertical blanking interval for other purposes. If such encroachment is to be prevented, then in general, the sum of the duration of the intervals separating the intervals containing video information in the scrambled television signal should equal the sum of the duration of the intervals separating the intervals containing video information in the composite television signal for each field.

It may be desirable to omit one or two intervals containing video information in the scrambled television signal and insert in their place signals containing digital data for the establishment of a digital communication channel between the scrambler and descrambler units. If this is done, then it should be appreciated that the last mentioned limitation need not be strictly followed. Furthermore a complete line of video information could be deleted on occasion.

In order to increase the perception of horizontal shearing, due to the variation of timing between lines of video information in the scrambled television signal achieved by this invention, on the cathode ray tube of a receiver's television not authorized to unscramble the scrambled television signal, the shifting of video information may be controlled so that in the scrambled television signal essentially each interval containing video information is shifted relative to the corresponding interval containing video information in the predecessor field. This factor, of course assumes that the unauthorized television receiver is somehow clever enough to ignore the irregular occurrence of the horizontal synchronization pulses and, for those horizontal synchronization pulses omitted, it is somehow able to determine when the beginning of each line of video information is to occur.

With further reference to FIG. 7, a shifted version of signal 124 is shown generally at 130. This signal is shifted relative to each of signals 124, 126 and 128 by an amount greater than the duration of the interval 42. A scrambled television signal is shown generally at 134 wherein the first interval containing video information has been derived from signal 124 and the second interval B‴ containing video information has been derived from the interval B in signal 124 after being delayed by a duration equal to the difference between signals 124 and 130. Following the end of this latter derived interval at time 136 it is seen that it is impossible to select any portion of signal 124 which is shifted in time relative thereto by a duration of zero or the amount by which signals 126 or 128 are shifted in time thereto. In otherwords, it is impossible to select any of the signals 124, 126 or 128 without eliminating some of the leading portion of the interval containing video information. In general, therefore, in order to prevent such an elimination no portion of the composite television signal should be shifted relative to at least another shifted version of the composite television signal that appears in the scrambled television signal by an amount greater than the duration of interval 42. Stated another way, each of the signals to be selected should be shifted only by an amount less than or equal to the duration of the interval 42 from some other signal to be selected.

Figure 8:
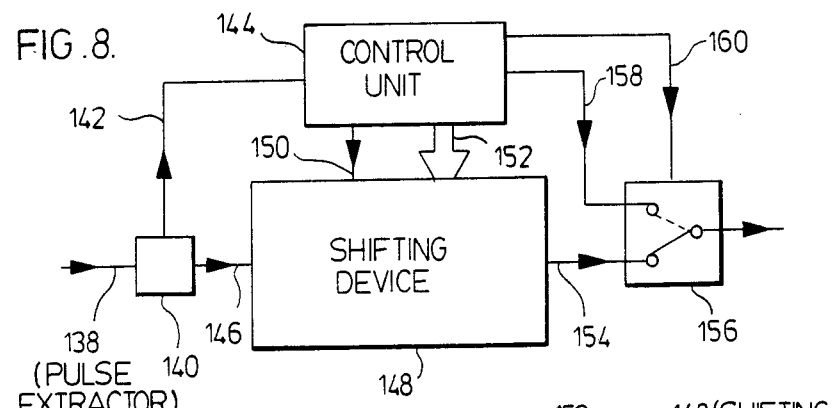
FIG. 8 is a diagrammatic representation of apparatus used to scramble a composite television signal.

With reference to FIG. 8, apparatus is shown that may be used to scramble a composite television signal by shifting in time according to a predetermined scheme at least some portions of the composite television signal in a manner to eliminate at least some horizontal synchronization pulses while maintaining substantially all the video information. A base-band composite television video signal on line 138 from either a pre-recorded medium or a live presentation is passed to a synchronization pulse extractor 140 which extracts synchronization information from the composite television video signal and passes it by line 142 to control unit 144 which may either be a dedicated "hard-wired" digital controller or a suitably programmed and interfaced micro or mini-computer device. Also output from the synchronization extractor 140 is the composite television video signal itself which is passed by line 146 to a shifting device 148 which shifts the composite television video signal to produce the scrambled television signal. Two embodiments of the shifting device 148 are detailed in FIGS. 9 and 10 and will be discussed below. The control unit 144 receives timing information from the synchronization extractor 140 and provides a clock signal by line 150 to the shifting device 148. The control device also has an output bus 152 which provides signals to the shifting device 148 to control the shifting of the composite television video signal to form the scrambled television signal.

The scrambled television signal is passed from the shifting device by line 154 to an electronic double-throw switch 156. The second input to the electronic switch 156 comes from the control device 144 through line 158 and the switching of the electronic switch 156 is controlled by the control device through line 160. As mentioned above, a control signal indicative of the predetermined scheme and, optionally, a starting signal representing the commencement of the predetermined scheme may periodically be inserted into the scrambled television signal. These signals appear on line 158 and electronic switch 156 is controlled to select same. Also, if it is desired to address the unscrambling units, addressing information in the form of digital data may be periodically injected into the scrambled television signal through line 158. Furthermore, data indicating tiering levels may be periodically injected into the scrambled television signal in conjunction with the addressing information to further limit certain descrambling units to the reception of particular prior authorizated channels of scrambled television information.

In order to permit the unscrambling of the scrambled television signal, timing information is provided to the unscrambler so that the time at which portions of the scrambled television signal are to be shifted and the time at which horizontal synchronization information is to be inserted during unscrambling may be determined. In the preferred embodiment of this invention, several lines of video information on either immediate side of the vertical blanking interval in the composite television video signal are not shifted. In particular, three lines before the vertical blanking interval and a number of lines after the vertical blanking interval are not shifted. Further, the vertical blanking interval is not shifted. Therefore, in the scrambled television signal there will appear several horizontal synchronization pulses on either side of the vertical blanking interval that are in proper time relationship to one another. The vertical blanking interval contains some horizontal synchronization information which also may be used to determine the timing information.

When the scheme of shifting portions of the composite television signal is controlled as aforesaid, the scrambled television signal will contain a sequence of horizontal synchronization pulses about and in the vertical blanking interval which are periodic and properly positioned. At the unscrambler device these periodic horizontal synchronization pulses are detected and the timing of their occurrence provides a time base signal to determine when portions of the scrambled television signal are to be shifted to effect unscrambling. In this way the unscrambler and the scrambler are linked in time. Further, the time base controls the timing of insertion of horizontal synchronization information to provide an unscrambled television signal. A time base generator can lock onto the several horizontal synchronization pulses on either side of the vertical blanking interval and in the vertical blanking interval and provides a time base signal used during the unscrambling of the following shifted lines of video information.

Alternatively in order to provide a time base to control such timing, a signal of accurate frequency may be periodically injected into the scrambled television signal by the controller through line 158 and electronic switch 156. The frequency of such a signal may be equal to the colour burst frequency. At the unscrambling units a phase locked loop device locks itself to this injected signal of accurate frequency and, by means of a suitably selected combination of multipliers and dividers, timing of the shifting of the signals and insertion of horizontal synchronization pulses in the unscrambler can be accurately controlled within the tolerances which will provide an adequate image on the cathode ray tube of the television of the receiver.

Figure 9:
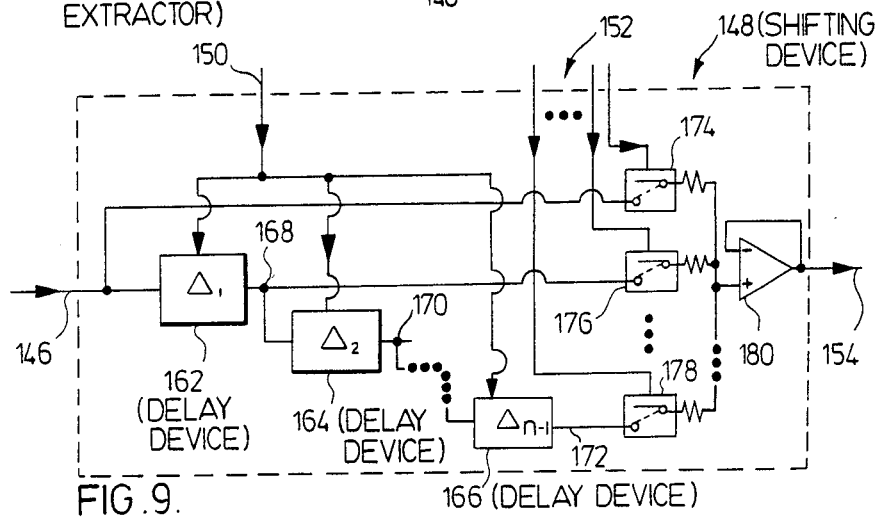
FIG. 9 is a detailed representation of a shifting device.

With reference to FIG. 9, one embodiment of the shifting device is shown which produces from the composite television video signal at least one signal corresponding thereto and shifted in time relative thereto. One of the composite television video signal and the at least one corresponding signal are successively selected according to a predetermined scheme and combined to produce the scrambled television signal having omitted at least some of the horizontal synchronization information. It should be noted that all of the selected signals could be delayed relative to the composite television signal, however, no useful purpose would be achieved in delaying in an overall fashion each and every one of the selected signals relative to the composite television video signals as such could only be viewed as an unnecessary extra step.

The composite television video signal enters the shifting device on line 146 and is passed directly to electronic switch 174. FIG. 9 illustrates a shifting device wherein (N−1) signals are produced that correspond to the composite television video signal and have time shifts relative thereto. In order to prevent undue cluttering of the figure only three delay means and three electronic switches are shown with the (N−1)th device being shown as joined to the rest of the circuit by means of dots, however, it should be appreciated that in practice the delay means and the electronic switches would actually be wired together. Delay devices 162, 164 and 166 are shown in FIG. 9 as being cascaded and tapped at their junctions 168, 170 and the termination of the cascaded delay devices at 172 to provide (N−1) signals corresponding to the composite television video signal and shifted in time relative thereto.

It will be appreciated that the signal appearing on line 168 is delayed relative to the composite television video signal by an amount equal to the delay factor $\Delta_1$ of device 162. Similarly, at each of the tapped junctions and the termination of the cascaded delayed devices signals appear which are delayed relative to the composite television video signal. For example, the signal appearing at 172 will be delayed by an amount equal to the sum of the delay factors $\Delta_1$, $\Delta_2$, through $\Delta_{(n-1)}$.

The delay devices 162, 164 and 166 preferrably are digitally controlled analogue shift registers. The delay devices are clocked by the signal 150 originating in the control device 144. In the preferred embodiment of this invention the digitally controlled analogue shift register means are charge coupled devices having 91 elements and are clocked at a frequency of approximately 14.31 MHz to each produce a delay of approximately 6.35 microseconds which is substantially equal to the duration of a front porch and horizontal synchronization pulse of a composite television video signal.

Each of the digitally controlled analogue shift register means may also be formed from an analogue to digital signal converter, a digital shift register and a digital to analogue signal converter. Although in the preferred embodiment of this invention the delay of each of the devices 162, 164 and 166 are equal and thereby produce signals shifted relative to the composite television video signal by integer multiples of the minimum shift, namely 6.35 microseconds in the preferred embodiment which, incidentally, is essentially equal to the duration of the front porch and horizontal synchronization pulse of a composite television signal, it should be appreciated that other delay factors may be introduced as explained above with reference to signal 132 in FIG. 7.

The signals on lines 146, 168 and 172 are each passed to one pole of single-pole single-throw electronic switches 174, 176 and 178. These switches are electrically connected to one another and passed to buffer amplifier 180 which takes the selected signal from either line 146, 168 or 172 and outputs it on line 154 as the scrambled television signal. Each of switches 174, 176 and 178 are connected to the control device 144 through bus 152. The control device, for this embodiment of the shifting device, closes only one of switches 174, 176 or 178 at any particular period of time according to the predetermined scheme. The signals 146, 168 and 172 which are selected according to the predetermined scheme are passed by one of electronic switches 174, 176 and 178 and appear essentially immediately as a portion of the scrambled television signal on line 154.

Figure 10:
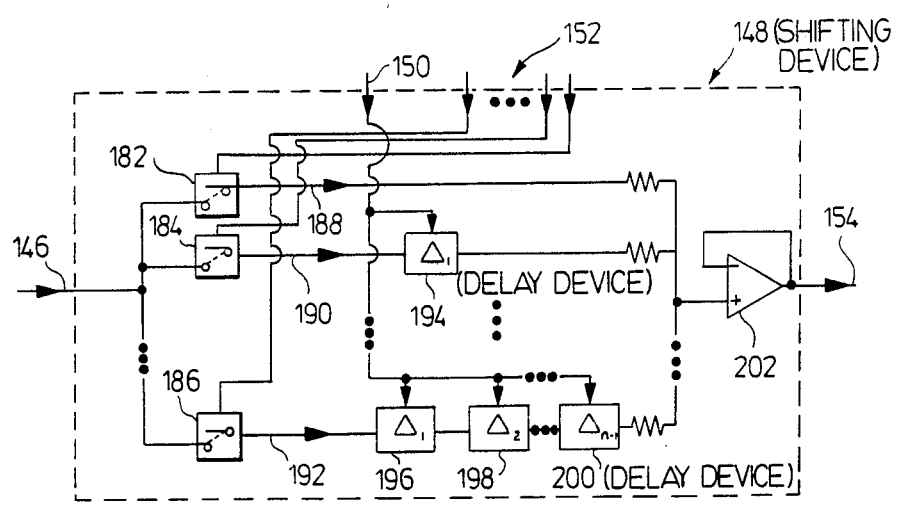
FIG. 10 is an alternate structure for a shifting device.

With reference to FIG. 10, another embodiment of the shifting device 148 is shown which passes the composite television signal 146 according to the predetermined scheme through shifting means having at least two channels with at least one non-zero time shift value. The signals from the channels are combined to produce the scrambled television signal.

The composite television signal 146 is passed to each of single-pole single-throw electronic switches 182, 184 and 186 which are selectively closed in response to signals on bus 152 from control device 144. In this embodiment of the shifting device the time in which the switches 182, 184 and 186 are closed are different than in the embodiment shown in FIG. 9 and details of the timing of the closing of the switches will be discussed below in further detail with reference to FIG. 10. The signals output from switches 182, 184 and 186 appear on channels 188, 190 and 192 respectively and are passed either directly on channel 188 or through delay device 194 in the case of channel 190 or through delay devices 196, 198 and 200 in the case of channel 192 to buffer amplifier 202 where the signals are combined to produce a scrambled television signal at line 154.

The channel comprising line 188 has a zero time shift value whereas the channels 190 and 192 have non-zero time shift values. The delay devices 194, 196, 198 and 200 are similar to the delay devices discussed above with reference to FIG. 9 and are clocked by the signal on line 150 from control device 144. It should be appreciated that the delay devices on channel 192 may be combined together in the form of one delay device, however, for purposes of illustration (N−1) individual delay devices have been shown.

Figure 11:
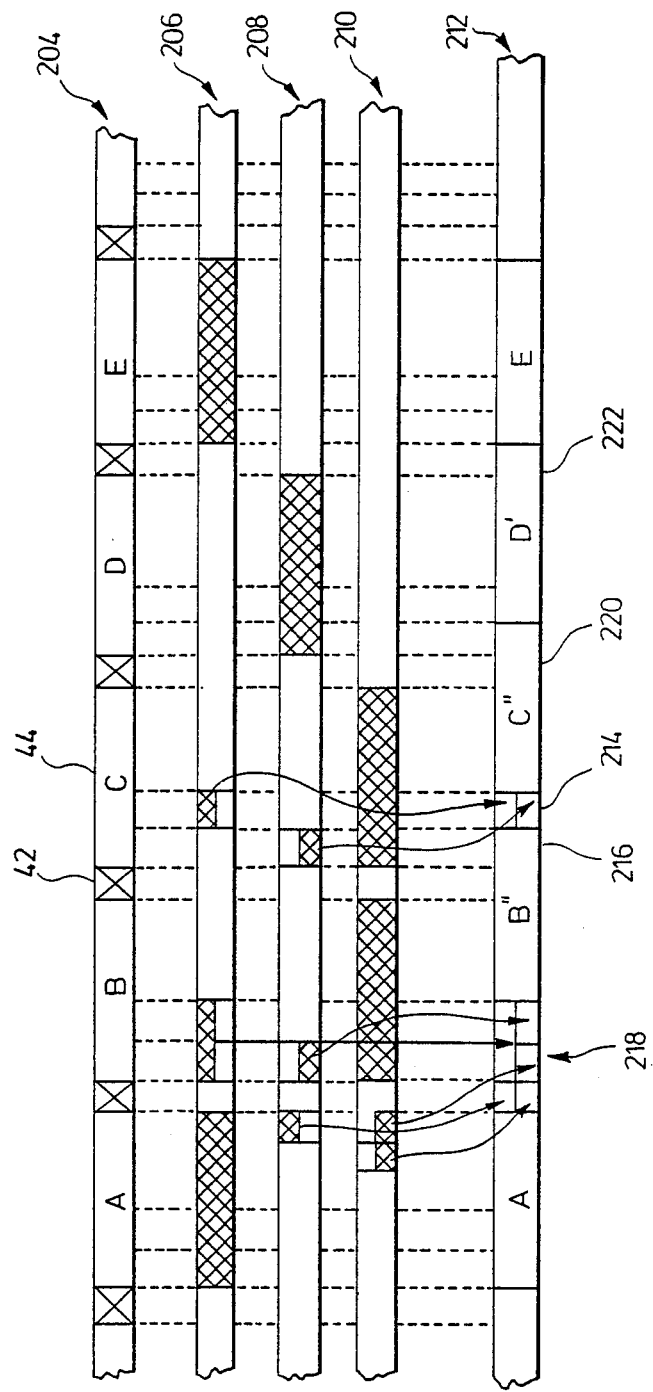
FIG. 11 is a further timing diagram showing various scrambling techniques.

In order to further detail the differences in the timing of the closing of the electronic switches in the embodiment illustrated in FIG. 10, as compared to the embodiment illustrated in FIG. 9, reference is made to FIG. 11. A portion of a composite television signal having intervals 44 containing video information separated by intervals 42 containing synchronization information necessary for reception by a television is shown generally at 204 with the intervals 44 being labelled as A through E for reference purposes. A scrambled television signal is shown generally at 212. Diagrammatic timing diagrams are shown generally at 206, 208 and 210 wherein the cross-hatched portions indicate the closure of the electronic switches illustrated in FIG. 10 and the blank portions represent open switches. Timing diagram 206 corresponds to switch 182 in FIG. 10 where channel 188 has a zero time shift value, timing diagram 208 corresponds to switch 184 in FIG. 10 where channel 190 has a non-zero time shift value equal to the duration of interval 42 and timing diagram 210 corresponds to switch 186 in FIG. 10 where channel 192 has a non zero time shift value equal to two times the duration of interval 42.

With reference to the scrambled television signal shown generally at 212, the interval A containing video information has been derived from the signal 204 by the closure of switch 182 during the same period of time in which the interval A was being derived. However, with respect to the interval B" containing video information in the scrambled television signal 212, the switch 186 was initially closed at a period of time preceding the beginning of the derivation by a period of time equal to two times the duration of interval 42. This follows since when the interval B of signal 204 is passed through switch 186 to channel 192 it takes a period of time equal to two times the duration of interval 42 before the information is passed to buffer amplifier 202. Similar, with respect to the interval C" in the signal 212 and with respect to the interval D' in signal 212 it should be noted that the switches 186 and 184 were closed prior to the derivation of the intervals by an amount equal to two times and one times the duration of interval 42 respectively. In general, the time at which the composite television signal is passed to a channel of the shifting device for shifting by a non-zero amount of time precedes the time at which the shifted signal is to be combined to produce the scrambled television signal by a period of time equal to the time by which the signal is shifted in the channel.

With reference to the period of time 214, it is seen that either switches 182 or 184 may be closed respectively at periods of time 214 or 216 to produce extraneous video information in the intervals separating the intervals B" and C". It should be noted that these times are the same time at which switch 186 is closed to derive the interval C". In other words, at certain times the composite televison signal is simultaneously passed for a period of time to at least two channels of the shifting means for shifting by two different amounts of time when it is desired to have extraneous video information separating the intervals containing video information in the scrambled television signal. This is in direct contradistinction to the embodiment illustrated in FIG. 9 wherein only one signal at any particular time was selected. However, as can be seen from the timing diagrams only one signal from one channel at any time affects the scrambled television signal 212. Further examples of this phenomena are illustrated at the periods of time generally designated as 218, however, it is believed that it is unnecessary to detail same. In general, if it is desired to ensure that only extraneous portions of video information appear in the intervals separating intervals containing video information in the scrambled television signal then the composite television signal is passed to at least two channels of the shifting device for shifting by two different amounts of time simultaneously for a period of time when the duration of an interval separating intervals containing video information in the scrambled television signal is to be made greater than or equal to the duration of the interval separating intervals containing video information in the composite television signal.

On the other hand, if reference is made to either the adjacent intervals C" and D' or adjacent intervals D' and E in the scrambled television signal 212 it it seen that for the periods of time 220 or 222 the composite television signal is not passed to any channel of the shifting device. This follows, since a transition has been made from a channel which delays the composite television signal appearing in the scrambled television signal by an amount greater than that of the next selected channel. In general, no composite television signal is passed to any channel of the shifting device for a period of time when the duration of an interval separating intervals containing video information in the scrambled television signal is to be made less than the duration of the intervals separating intervals containing video information in the composite television signal.

The scrambling techniques and apparatus described thus far have particular application in subscription television systems where the scrambling is performed at the transmitter or head-end station. Naturally the scrambled television signal will be modulated on a radio frequency carrier and will be transmitted to a plurality of subscribers who are authorized to unscramble the scrambled television signal. The mode of communication is most often by means of a coaxial cable, however, the techniques and apparatus described in this invention also may be used in free-space transmissions or, presumably in the near future, by means of fiber-optic links. Also, it should be appreciated that a number of composite television signals may be individually scrambled and transmitted on a number of different channels in a subscription television system.

The details concerning the manner in which a subscriber's unscrambling unit is authorized to unscramble the scrambled television signal will not be discussed in detail in this disclosure. Each individual subscriber's unscrambler may be addressed to enable it to effect unscrambling or, it may be dedicated device that is "hard-wired" to enable the unscrambling of certain channels to be effected As previously mentioned, a control signal may be periodically injected into the scrambled television signal that is indicative of the predetermined scheme of scrambling and this control signal is received by unscrambling units and used to reconstruct the particular predetermined scheme of scrambling that is employed at any particular time. Other possibilities would include simple having one fixed predetermined scheme of scrambling that does not vary over time and have each of the authorized unscrambling units beforehand provided with at least a key to this particular predetermined scheme.

It is important, however, to provide an accurate basis to the unscrambling units for determining the time at which various portions of the scrambled television signal are to be shifted to effect unscrambling and by what amount. Any error in the time or the amount by which portions of the scrambled television signal are shifted to produce a signal suitable for reception by a television will manifest itself as a degradation of the visual quality of the video information displayed on the cathode ray tube of the television of the receiver. In particular, phase errors produce a horizontal displacement of the video information displayed and frequency errors produce a "jitter" effect of the video information displayed.

In the preferred embodiment of the unscrambling devices, the timing information is extracted from the scrambled television signal by detecting the several horizontal synchronization pulses on either immediate side of the vertical blanking interval and in the vertical blanking interval that were preserved in the scrambling step. These horizontal synchronization pulses provide information to a time base generator to conrol the timing of the insertion of horizontal synchronization information and the shifting of portions of the scrambled television signal for the remainder of the field of the scrambled television signal. The generator is accurately synchronized in frequency and phase during each occurrence of the several regular occurring horizontal synchronization pulses and timing information for unscrambling purposes can be derived from the generator by means of dividing and multiplying circuits for the remainder of the time.

The timing information extracted is important to determine the time at which certain portions of the scrambled television signal are to be shifted to produce the partially unscrambled television signal. However with respect to the amount of shifting in practice it has been found adequate to provide a crystal controlled oscillator to determine the clock frequency at which the digitally controlled analog shift registers are clocked at. Any variations in the consistency of the crystal controlled oscillator will simply affect the amount by which the portion of the scrambled television signal is shifted and in practise it has been found unnecessary to link the clocking of the digitally controlled analog shift registers at the scrambler and unscramblers.

As previously mentioned, an accurate frequency may be alternatively periodically injected into a portion of the scrambled television signal to provide an accurate time base and each unscrambling unit may be provided with a phase locked loop device that locks itself to this accurate frequency to provide a time base which is in synchronization with the timing in the scrambler unit. Other possibilities could include transmitting a time base over a separate channel to each of the unscrambling units.

A particular unscrambling unit authorized to unscramble the scrambled television signal receives a scrambled television signal having at least some portions of video information shifted in a manner to eliminate at least some horizontal synchronization pulses while maintaining substantially all of the video information. The scrambled television signal is unscrambled by extracting the timing information and shifting in time, according to a scheme determined by the scheme in which the scrambled television signal was scrambled, at least some portions of the scrambled television signal to produce a partially unscrambled television signal which has adjacent lines of video information separated by intervals of essentially equal duration substantially corresponding in duration to the intervals separating the lines of video information in the composite video signal. Horizontal sychronization pulses are inserted into the partially unscrambled signal to produce a composite video signal that is suitable for reception by a television.

Figure 12:
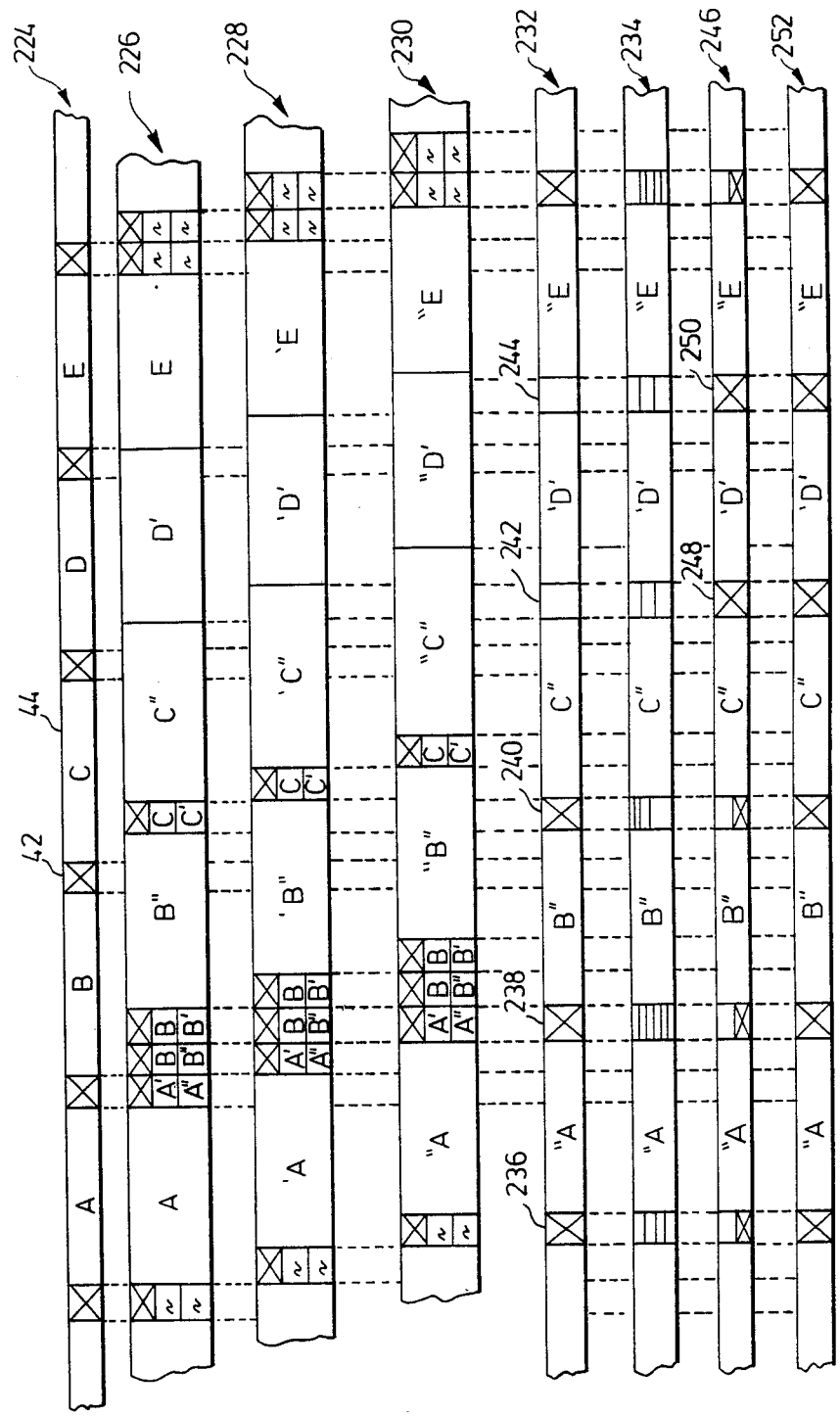
FIG. 12 is a timing diagram showing the unscrambling of a scrambled signal.

With reference to FIG. 12, a portion of a composite television signal is shown generally at 224 having intervals 44 containing video information separated by intervals 42 containing horizontal sychronization information necessary for reception by a television. The intervals containing video information are labelled A through E for reference purposes. Shown generally at 226, is a portion of a scrambled television signal that corresponds to the scrambled television signals shown generally at 106 and 108 in FIG. 6. In the signal 226, the intervals separating intervals containing video information are shown alternatively as having at least some of the horizontal synchronization information designated by the "X's" or extraneous portions of video information designated by the letters therebeneath. Shown generally at 228 and 230, are scrambled television signals corresponding to the scrambled television signal 226 and shifted in time relative thereto by delays in the amount of one and two times the duration of interval 42 respectively. For reference purposes the labelling of the intervals containing video information in the signals 228 and 230 are preceeded by the superscripts ' and " respectively.

Shown generally at 232, is a partially unscrambled television signal that has been produced by shifting portions of the scrambled television signal 226 according to a scheme determined by the scheme in which the signal 224 was scrambled. The signal 232 results from the scrambled signal shown generally at 106 in FIG. 6 wherein at least some of the intervals containing horizontal synchronization information necessary for reception were preserved. The signal shown generally at 234 is a partially unscrambled television signal which is produced in a manner similar to that in which signal 232 was produced, however, from the scrambled television signal shown generally at 108 in FIG. 6 wherein extraneous video information was inserted in the intervals separating intervals containing lines of video information. As such, the signal 234 contains none of the horizontal synchronization information necessary for reception whereas the signal 232 contains some of the horizontal synchronization information necessary for reception at periods of time 236, 238 and 240. However, at the periods of time 242 and 244 the signal 232 omits the horizontal synchronization information necessary for reception.

The details of the scheme in which the portions of the scrambled television signal are shifted in time to produce the partially unscrambled television signal will be discussed with reference to the partially unscrambled television signal 234. The interval "A has been derived from the interval A in the scrambled television signal 226 by shifting it in time by a delay factor equal to two times the duration of interval 42. Stated another way, it has been derived from the interval "A in signal 230. The interval B" in signal 234 has been derived from the interval B" in the scrambled television signal 226 without any shifting in time. The remaining intervals C", 'D' and "E are similarly derived from the scrambled television signal by shifting the intervals C", D' and E by delay factors of zero, one times the duration of interval 42 and two times the duration of interval 42 respectively. It should be noted that the interval "A in the partially unscrambled television signal is a shifted portion of the scrambled television signal 226 whereas the interval B" is a unshifted portion of the scrambled television signal 226. As a general rule, to unscramble the scrambled television signal each interval containing video information in the scrambled television signal is shifted by an amount of time equal to the maximum period of time any interval of the composite television signal was shifted to produce the scrambled television signal less the actual period of time the interval containing video information in the composite television video signal was shifted to produce the scrambled television signal. Therefore, ignoring delays due to, among other things, the transmission time between the scrambler and unscrambler, the partially unscrambled television signal will be delayed in time relative to the composite television signal that was scrambled by an amount equal to the maximum period of time any interval in the composite television signal was shifted. This can be seen with reference to signal 232 which is delayed relative to signal 224 by an amount equal to two times the duration of interval 42, this amount being equal to the relative time shift between signals 100 and 104 in FIG. 6.

The intervals separating intervals containing lines of video information in the partially unscrambled signal 234 are shown to have alternate selections of video portions of the scrambled television signal 226.

This signal does not have all of the horizontal synchronization information necessary for reception and therefore horizontal synchronization information must be reinserted before the signal can be received by a television. The signal generally designated at 246 is representative of the horizontal synchronization information that must be reinserted. As previously mentioned, the signal 232 had some horizontal synchronization information but omitted other portions thereof at periods of time 242 and 244. Therefore, at least those intervals where horizontal synchronization information has been omitted require the insertion of horizontal synchronization information and this is shown at periods of time 248 and 250. In the case of partially unscrambled signal 234, none of the horizontal synchronization information necessary for reception is present, and therefore substantially all the intervals containing horizontal synchronization information necessary for reception must be reinserted. This is shown in the signal 246 by the combination of the full "X's" and the "X's" in the lower half of the diagram. It should be noted that is is possible to reinsert the horizontal synchronization necessary for reception, given that the unscrambling unit has knowledge of the time at which it should appear, since the horizontal synchronization information is of a predetermined repetitive form and not unique to any particular portion of the composite television signal which was scrambled.

The partially unscrambled signal with the inserted horizontal synchronization information is shown generally at 252 and is now in a form suitable for reception by a television. If any of the back porches and colour burst portions in the scrambled television signal had been shifted to a grey level they should be re-shifted back to the black level as they would appear in a composite television signal.

Figure 13:
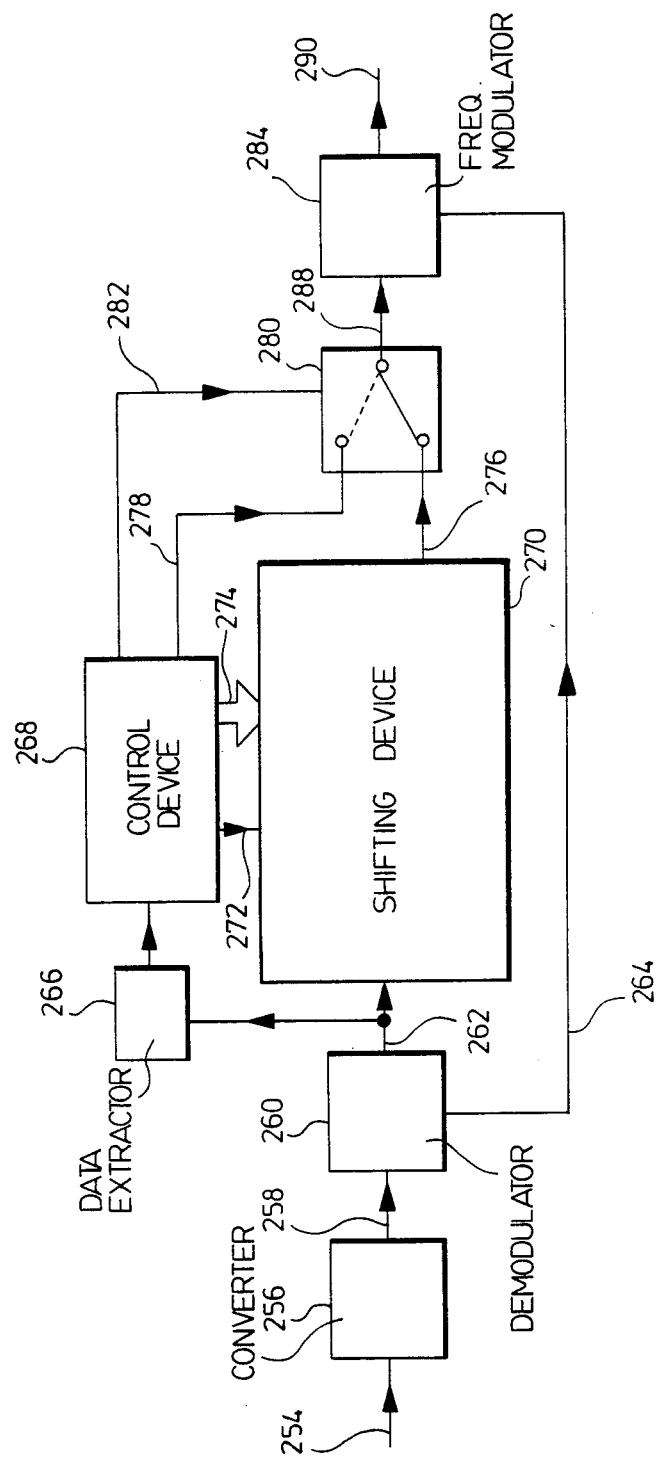
FIG. 13 is a block diagram of an unscrambler used according to the present invention.

With reference to FIG. 13, apparatus is shown that may be used to unscramble a scrambled television signal having at least some portions of video information shifted to eliminate at least some horizontal synchronization pulses while maintaining substantially all of the video information. The apparatus includes a shifting device for shifting at least some portions of the scrambled television signal to produce a partially unscrambled television signal which has adjacent lines of video information separated by intervals of essentially equal duration substantially corresponding in duration to the intervals separating lines of video information in a composite television signal. The apparatus also includes a control device which controls the shifting device according to a scheme determined by the scheme in which the scrambled television signal was scrambled. The control device also inserts into the partially unscrambled television signal horizontal synchronization information necessary for reception by a television to produce a composite television video signal suitable for reception by a television. Timing information is extracted from the scrambled television signal and used for determining both the time at which portions of the scrambled signal are to be shifted and the time at which horizontal synchronization information is to be inserted into the partially unscrambled signal.

A composite television signal modulated on a radio frequency carrier on line 254 is passed to a tuner 256 which shifts the signal to approximately the frequency of channel "3" and outputs same on line 258. The signal on line 258 is demodulated by radio frequency demodulator 260 which outputs a base-band composite television video signal on line 262 and the audio portion of the signal on line 264. The converter 256 and radio frequency demodulator 260 may be combined in one unit, however, since many subscribers already own their own converter, it has been shown separately for purposes of illustration.

Data and timing extractor 266 is connected to the composite television signal on line 262 and extracts the regular occuring horizontal synchronization pulses about the vertical blanking interval that had been maintained in the scrambled television signal for timing purposes. Data extractor 266 may also extract addressing information and information respecting the particular predetermined scheme by which the television signal was scrambled if such information is transmitted with the scrambled television signal. The information that is extracted by data extractor 266 is passed to a control device 268 for, among other things, the generation of the timing signals to control the shifting device 270 to shift portions of the scrambled television signal to produce the partially unscrambled television signal and to control the form and the time at which horizontal synchronization information necessary for reception by a television, and in particular horizontal synchronization pulses, are to be inserted into the partially unscrambled television signal.

A shifting device 270 receives the scrambled television signal on line 262, a clock signal on line 272 and signals on bus 274 from the control device 268 to control the timing and the amount by which the signal on line 262 is to be shifted. The shifting device 270 operates in an identical manner to the shifting devices in the scrambler which were discussed above with respect to FIGS. 9 and 10. The shifting device 270 outputs on line 276 a partially unscrambled television signal which has adjacent lines of video information separated by intervals of essentially equal duration substantially corresponding in duration to the intervals separating lines of video information in the composite television signal. The control device 268 outputs horizontal synchronization information necessary for reception by a television on line 278 and this information is inserted into the partially unscrambled television signal on line 276 through electronic switch 280 which is controlled by the control device 268 through line 282. The output of the electronic switch 280 is a base-band composite television video signal and is passed to radio frequency modulator 284 through line 288. The modulator 284 combines and modulates the composite television video signal on line 288 and the audio signal on line 264 and outputs on line 290 a radio frequency modulated composite television video signal with an audio portion which may be then passed to the input of a standard television receiver for reception.

Figure 14:
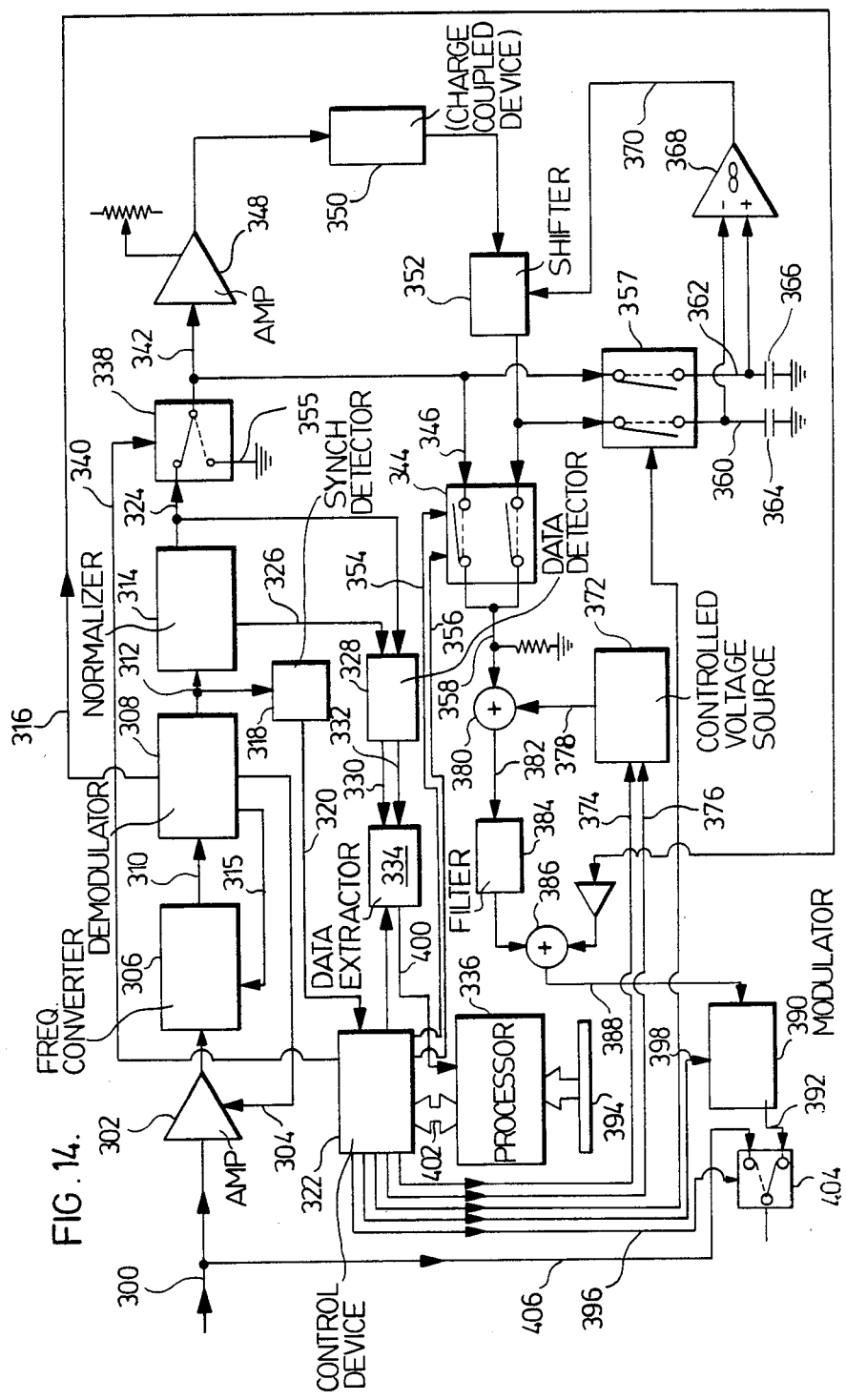
FIG. 14 is a detailed schematic of an unscrambler.

With reference to FIG. 14, a more detailed block diagram of an unscrambling unit having one delay device is illustrated. A radio frequency modulated scrambled television signal on line 300 is passed to a preamplifier 302 which is provided with automatic gain control circuitry controlled by a signal on line 304 from the demodulator 308. The signal from the preamplifier 302 is then passed through an intermediate frequency converter 306 which shifts the radio frequency modulated scrambled television signal from channel "3" to an intermediate frequency. The intermediate frequency signal is passed on line 310 to demodulator 308 which demodulates the signal and provides a base-band scrambled television signal void of an audio sub-carrier on line 312. The demodulator also controls the frequency of the intermediate frequency converter 306 through line 315.

The demodulator 308 does not demodulate the frequency modulated audio subcarrier portion of the scrambled television signal but rather simply passes the FM signal on line 316 to be later mixed with the unscrambled television signal. The base-band television signal on line 312 is passed to DC level normalizer device 314 and synchronization detector device 318. The several horizontal synchronization pulses that were preserved on either side of the vertical blanking interval in the scrambled television signal are detected by synchronization detector 318 and a signal representing the occurrence of the pulses is passed by line 320 to a timing and control device 322.

Output from the DC level normalizer 314 on line 324 is a levelled base-band scrambled television signal. Also output from DC level normalizer 314 on line 326 is a signal indicative of the received reference level. The signals on line 324 and 326 are passed to data detector device 328 which detects and outputs on lines 330 and 332 signals representative of data bits "0" and "1". As previously mentioned, a data communication channel is established between the scrambler and unscrambler so that control signals indicative of the predetermined scheme, addressing information and tiering level information may be transmitted to the unscramblers. This digital data is encoded in the last line of a field of information in the case of an even field and in the second last line in the case of an odd field. Also, one line in the vertical blanking interval contains digital data information. Timing and control device 322 provides a "window" to data extractor 334 to determine when the data on lines 330 and 332 should be passed to a micro processor 336 for subsequent processing.

The levelled base-band scrambled television signal on line 324 is passed also to electronic switch 338 which is controlled by the timing and control device 322 on line 340. Normally, the switch is selected so that the signal on line 324 is passed to line 342. The signal on line 342 is passed to one input of electronic switch 344 on line 346 and to the second input of electronic device 344 on line 346 through gain device 348, charge coupled device 350 and DC level shifter 352. Thus the electronic switch 344 receives an undelayed version of the scrambled television signal and a delayed version of the scrambled television signal. Timing and control device 322 controls the electronic switch 344 through lines 354 and 356. Either the undelayed scrambled television signal or the delayed television signal may be selected by the electronic device 344 in accordance with a scheme determined by the scheme in which the scrambled television signal was passed to provide on line 358 a partially unscrambled television signal. The timing information derived from the synchronization detector 318 is also used to determine when switching of the undelayed and delayed signals should be effected.

Charge coupled device 350 is a 91 element device and is clocked at a frequency of approximately 14.31 MHz. However, the charge coupled delay device 350 has variations in gain and DC bias level. It has been found adequate to control variations in the gain of the device 350 by providing a gain amplifier 348 which may be calibrated at the factory before a unscrambling device is shipped. However, DC bias level variations in the charge coupled device 350 and/or device 348 must be compensated for in actual use. In order to provide for such compensation a feedback mechanism is provided. Timing device 322 switches electronic switch 338 from line 324 to a reference voltage which in the Figure is shown as zero on terminal 355 during the second last complete interval which would normally contain video information in each field of the scrambled television signal.

The reference voltage is passed directly to one input of double input electronic switch 357. After the reference voltage has had an opportunity to propogate through the charge coupled device 350 and be presented at the other input of electronic switch 357 the switches in electronic switch 357 are closed for a period of time thereby establishing voltages on lines 360 and 362 which are held by capacitors 364 and 366. If the charge coupled device 350 did not introduce any bias levels the voltages on lines 360 and 362 would be identical since they both originated from the injected voltage level at terminal 355 of the electronic switch 338. Any variations in the voltages on lines 360 and 362 will be detected and amplified by differential amplifier 368 which has a large gain, locally approaching infinity and appropriate phase compensation circuitry in order to provide a stable feedback loop. The signal from amplifier 368 is passed to DC level shifter 352 on line 370. Any variation in the voltages on lines 360 and 362 will cause a negative feedback signal on line 370 which will control the DC level shifter 352 to drive the voltage differences to 0. As such, bias level offsets introduced by charge coupled device 350 and device 348 are periodically being compensated for the DC level shifter 352 each field of video information. The compensation is maintained for the subsequent field of video information until another compensation is made at the end of the video portion thereof. The balancing technique to compensate for any bias levels introduced by the charge coupled device 350 and device 348 involves periodically substituting into the partially unscrambled television signal a reference voltage, allowing the reference voltage to propogate through the delay device and the undelayed line, sampling and holding the two passed signals and compensating for any differences in the two voltages by a negative feedback circuit controlling DC level shifter 352.

It should also be appreciated that a similar balancing technique may be used in the scrambler to compensate for any bias level variations in its delay elements. Furthermore, similar techniques can be used for multiple delay apparatus.

The partially unscrambled television signal on line 358 must have the horizontal synchronization information that was omitted therefrom reinserted so that the signal may be properly received by a television receiver. A controlled voltage source 372 is actuated by lines 374 and 376. The timing control device 322 knows when the horizontal synchronization information is to be inserted as a result of the timing information that was extracted from the scrambled television signal. The control voltage source 372 provides a first voltage level equal to that of the front porch in a composite television signal and a second voltage level equal to that of the horizontal synchronization tip in a composite television signal and these two voltages are actuated respectively by lines 374 and 376. The timing and control device 322 actuates the first voltage in the controlled voltage source 372 through line 374 at the time when the beginning of the front porch is to be inserted into the partially unscrambled television signal. Shortly after this period of time the timing and control device opens both of the switches in electronic switch 344. The signals on lines 378 and 358 are combined in summing device 380 and passed therefrom on line 382. The brief overlapping period of time in which a voltage is delivered by the controlled voltage source 372 and the electronic switch 344 to summing device 380 prevents switching transients appearing on line 382. The timing and control device 322 introduces a signal to the controlled voltage source 372 on line 376 which steps the voltage delivered therefrom from the front porch level to the horizontal synchronization tip level. This voltage is maintained for the duration of a normal horizontal synchronization pulse. Thereafter the voltage delivered on line 378 by controlled voltage source 372 is turned off. Therefore, the controlled source 372 has introduced front porches and horizontal synchronization pulses into the partially unscrambled television signal to produce an unscrambled television signal on line 382.

The unscrambled television signal on line 382 is passed through low pass filter 384 to device 386 where the radio frequency FM modulated audio subcarrier portion is recombined therewith. The signal emerging from device 386 is passed by line 388 to a modulator 390 which modulates the unscrambled television signal to a radio frequency which is then output on line 392 for reception by a standard television receiver.

The unscrambler is provided with a static register 394 which contains a serial number indicative of the particular unscrambling device. The micro processor 336 which has received addressing information, among other information, compares each of the received addresses with the information stored in device 394. When the micro processor determines that there is a match between a received address and the information stored in register 394 the timing and control device 322 is enabled to effect unscrambling. The micro processor 336 also receives control signals from time to time indicative of the scheme in which the television signal was scrambled and, by means of a pseudo random number algorithm controls the timing and control device 322 through line 402 to effect shifting of portions of the scrambled television signal. Also, the micro processor has received tiering level information which determines whether the particular unscrambling device is authorized to receive a particular channel. In the case that the unscrambler is not authorized to unscramble the particular channel being unscrambled, a signal is passed by line 398 to the modulator 390 to suppress the signal emerging therefrom on line 392. The micro processor may also receive digital information indicating that the unscrambler is now authorized to receive another particular tiering level. This feature makes it unnecessary for a service call to be made to the subscriber's home to alter the unscrambling device should the subscriber wish to receive another channel.

In the case that the micro processor 336 determines that the received signal is not scrambled, a signal is passed by line 396 to a electronic switch 404 which switches from the output of modulator 390 to the signal appearing on line 406, thereby totally bypassing the unscrambling circuitry.

Although the method of scrambling has been described at least in part with respect to a system where the signal may be processed to delay portions thereof different amounts as generally shown in FIG. 6, the preferred form of the invention, generally shown in FIG. 5, only uses one time delay whereby the signal is processed by selectively alternating according to a predetermined scheme in a manner to transmit the composite signal for some period of time followed by transmitting a signal delayed relative to the composite signal by an amount equal to the duration of a front porch and a horizontal synchronization pulse. Both of the signals 64 and 80 follow this criteria. Signal 80 exemplifies the preferred form of scrambling in that the predetermined scheme of scrambling has caused extraneous video information to be present in the scrambled signal at points A', B, C, D' and E'. The signal as shown includes no horizontal synchronization information and it is preferred that in any given field substantially all of the horizontal synchronization information is eliminated. The scrambled signal also has the time duration between at least some adjacent video information decreased as exemplified by portions C' and D. In this case, the portion of the composite signal between intervals of video information C and D, including a horizontal synchronization pulse, has been eliminated and adjacent video information, C and D has been shifted relative to each other such that video information, C', at least occupies the space from which a horizontal synchronization pulse has been removed. With this system, the quality of the unscrambled signal is high as video information is shifted in time, rather than altering other parameters of the signal. Shifting in time does not effect the signal quality as the video information is transmitted through the distribution system in the same form as if the signal was not scrambled.

As illustrated in FIG. 5, lines of video information can be shifted to eliminate synchronization information, including a horizontal synchronization pulse, however, if desired, synchronization information could be eliminated as a separate step before shifting of video information. In the preferred form of scrambling, which has been applied to composite signal 60 to produce signal 80 in FIG. 5, switching occurs after each line of video information and at some points such as interval A' B multiple selections are made. In this way, synchronization information is eliminated when decreasing the time duration between adjacent lines of video information and synchronization information is also replaced with extraneous video information when the time duration between adjacent video information in the scrambled signal is increased.

The preferred form of scrambling only requires one time delay device which delays the signal approximately 6.35 microseconds, eliminates horizontal synchronization information and allows shifting of video information. Furthermore, the system allows insertion of extraneous video information to mask the location of usable video information in the scrambled signal. With this system, the receivers for unscrambling are relatively simple and inexpensive to manufacture as only one time delay device is required per receiver. This is important as there are many receivers in a subscription television system and these units must be reliable.

With this scrambling technique, lines of video information remain essentially intact and are scrambled by shifting them relative to one another, thereby altering the timing of video information in the scrambled signal which must be corrected by the unscrambler. The order of video information preferably stays the same as the order found in the composite signal, however at least some synchronization information used by a television to properly display the video information is no longer transmitted. The invention recognizes that synchronization information both vertical and horizontal, is of a known or predetermined repetitive form and if not transmitted can be created and introduced by the unscrambler given that timing information is provided to link the scrambler and the unscrambler. Therefore, this invention, in its simplest form scrambles by shifting video information in a manner such that synchronization information is omitted and unscrambling usually requires the creation such omitted and shifting of lines of video information whereby this created information may be properly associated with the video information. This results in an unscrambled signal which substantially corresponds to the original composite signal. Therefore, in contrast to other delay techniques the preferred embodiment of the present invention effectively scrambles a composite television video signal by significantly altering the time relationship between adjacent video information. Significant shifting in time of two adjacent intervals of video information is possible as at least a portion of the signal therebetween is not transmitted, which due to its known or predetermined repetitive form can be created and inserted during unscrambling. Shifting of lines of video information by deleting horizontal synchronization causes horizontal shearing of the video information when displayed on a television, whereas deletion of vertical synchronization information causes a vertical jitter, as adjacent fields are no longer synchronized.

The specification also discloses how an interval of video information can be segmented although this technique results in a "glitch" in the unscrambled signal. The point to be made is that on occasion some lines of video information can be deleted particularly if they occur at the beginning or end of a field, on occasion trailing portions of lines of video information can be deleted and on occasion "glitches" can occur; however, these are not necessary with, or a direct result of, the present scrambling method. These occurrences, if used, would be controlled in order to maintain a satisfactory unscrambled signal for reception by a television. In the case of subscription pay television, shifting would normally be controlled to only eliminate synchronization information.

Although the elimination of synchronization information has been described with respect to the selective shifting of lines of video information, this shifting also results in intervals where information is inserted or repeated. For example, whenever the shifting is caused by switching from one signal to a second signal relatively delayed in time, information is repeated which is not necessary for unscrambling. Generally, information could be inserted and this could be from an entirely different source. It is also possible to transmit information which the unscrambler could use for other functions or for transmitting timing information for unscrambling.

This summary has broadly spoken of shifting in time adjacent intervals of video information, whereas in fact according to the preferred embodiment the actual time value of any shifting element is 6.35 microseconds produced by a charged couple device having 91 elements clocked at approximately 14.31 MHz. This delay is substantially equal to the duration of a front porch and a horizontal synchronization pulse of a composite television video signal. The timing relationship between a colour burst portion, which itself is synchronizing information, and a subsequent line of video information is critical in order to accurately extract chrominance information. Therefore, according to the preferred form of the invention in the case of a composite colour television video signal the colour burst portions are retained and are shifted together with their associated subsequent line of video information in the scrambling and unscrambling phases. As such, the time relationship between the colour burst portion and the subsequent line of video information is not disturbed. However, with very exact timing it is possible to shift a colour burst portion in relation to the subsequent line of video information. Since it is desirable, however, to provide relatively inexpensive unscrambling devices the preferred method of this invention is to not disturb the time relationship between the colour burst portion and the subsequent line of video information.

If desired, other scrambling techniques can be used in combination with the method disclosed. For example, inversion of the entire signal prior to transmission renders the signal received by a television unrecognizable. This technique on its own is not a "secure" system as it is easy to pirate, however in combination with the present shifting of video information method results in a signal which is both secure and unrecognizable.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or priviledge is claimed are defined as follows:

1. A method of scrambling a composite television video signal having intervals containing video information separated by horizontal synchronization pulses the method comprising shifting in time according to a predetermined scheme at least some portions of the composite television signal in a manner to eliminate at least some horizontal synchronization pulses between adjacent intervals containing video information.

2. A method of scrambling a composite television video signal as claimed in claim 1 wherein at least some adjacent intervals containing video information in the scrambled television signal are separated by a time duration of zero.

3. A method of scrambling a composite television video signal as claimed in claim 1 wherein the minimum amount of time a portion is shifted essentially equals the duration separating the intervals containing video information of the composite television video signal.

4. A method of scrambling a composite television video signal as claimed in claim 1 wherein the minimum amount of time a portion is shifted essentially equals the duration of a front porch and a horizontal synchronization pulse of the composite television signal.

5. A method of scrambling a composite television video signal as claimed in claim 4 wherein each amount of time a portion is shifted is an integer multiple of said minimum amount of time.

6. A method of scrambling a composite television video signal as claimed in claim 1 including periodically inserting into said scrambled television signal a control signal indicative of said predetermined scheme and periodically providing timing information.

7. A method of scrambling a composite television video signal as claimed in claim 1 wherein said step of shifting is controlled to introduce from time to time extraneous video information between adjacent video information in the scrambled signal.

8. A method of scrambling a composite television video signal having vertical blanking intervals separating the intervals containing video information as claimed in claim 1 wherein said step of shifting is controlled such that a number of horizontal synchronization pulses precede and a number of horizontal synchronization pulses follow each vertical blanking interval and the time duration thereof remains unchanged for use by a receiver in unscrambling of the signal.

9. A method for scrambling a composite television video signal having a sequence of intervals containing video information separated by intervals containing horizontal synchronization information necessary for reception by a television of a predetermined or known repetitive form, the method comprising processing the composite television signal to provide a scrambled television signal containing essentially all the video information of the composite television signal and omitting at least some of the horizontal synchronization information of the composite television signal necessary for reception, wherein at least some of the intervals containing video information in said scrambled television signal are separated by intervals having a duration less than the duration of the intervals separating the intervals containing video information of the composite television signal, wherein said processing is accomplished by shifting in time according to a predetermined scheme at least some portions of the composite television signal, and wherein said step of shifting is controlled to allow said scrambled television signal to be subsequently processed to provide a signal substantially corresponding to the composite television signal by creating and inserting any necessary horizontal synchronization information that has been omitted.

10. A method for scrambling a composite television video signal as claimed in claim 9, wherein said processing comprises producing from the composite television signal at least one signal corresponding to the composite television signal and having a time shift relative to the composite television signal of a duration at least substantially equal to the duration of a horizontal synchronization pulse, successively selecting according to said predetermined scheme one of the composite television signals and said at least one corresponding signal to produce said scrambled television signal.

11. A method for scrambling a composite video signal as claimed in claim 10 wherein the maximum time difference between each of said selected signals and at least another selected signal is less than or essentially equal to the duration of the intervals separating the intervals containing video information of the composite television signal.

12. A method for scrambling a composite television video signal as claimed in claim 10 wherein the time differences between the duration of each of said selected signals and at least another selected signal are essentially equal.

13. A method for scrambling a composite television video signal as claimed in claim 12 wherein said time difference is equal to the duration of a front porch and horizontal synchronization pulse of the composite television signal.

14. A method for scrambling a composite television video signal as claimed in claim 13 wherein said time difference equals approximately 6.35 microseconds.

15. A method for scrambling a composite television video signal as claimed in claim 10 wherein said step of selecting is controlled such that essentially any interval containing video information is derived from only one of the composite television signal and said at least one produced signal.

16. A method for scrambling a composite television video signal as claimed in claim 10 wherein essentially all the steps of selecting are controlled such that no signal is selected which is advanced in time relative to the prior selected signal by an amount greater than the duration separating intervals containing video information in the composite television signal.

17. A method for scrambling a composite television video signal as claimed in claim 10 wherein the time average of the durations of the intervals separating the intervals containing video information in said scrambled signal approach the time average of the duration of the intervals separating intervals containing video information in the composite television signal as time approaches infinity.

18. A method for scrambling a composite television video signal as claimed in claim 9 wherein the sum of the duration of the intervals separating the intervals containing video information in the scrambled television signal essentially equal the sum of the duration of the intervals separating the intervals containing video information in the composite television signal for any particular field of the composite television signal.

19. A method for scrambling a composite television video signal as claimed in claim 10 wherein essentially each line of video information in the scrambled television signal is shifted relative to the corresponding line of video information in the predecessor field.

20. A method for scrambling a composite television video signal as claimed in claim 10 wherein said at least one signal is produced by passing the composite television video signal through delay means.

21. A method for scrambling a composite television video signal as claimed in claim 20 wherein said delay means comprise digitally controlled analogue shift register means.

22. A method for scrambling a composite television video signal as claimed in claim 21 wherein said analogue shift register means comprise at least one charge coupled device.

23. A method for scrambling a composite television video signal as claimed in claim 21 wherein said analogue shift register means comprise an analogue to digital signal converter, a digital shift register means and a digital to analogue signal converter.

24. A method for scrambling a composite television video signal as claimed in claim 20 wherein said delay means are cascaded and tapped at at least one junction thereof and the termination thereof to provide at least two signals corresponding to the composite television signal and having at least two time shifts relative to the composite television signal.

25. A method for scrambling a composite television video signal as claimed in claim 22 wherein said at least one charge coupled device has 91 elements and is clocked at a frequency of approximately 14.31 MHz.

26. A method for scrambling a composite television video signal as claimed in claim 10 wherein said step of successively selecting is performed by single-pole single-throw electronic switches having one pole of each switch electrically connected to one another.

27. A method for scrambling a composite television video signal as claimed in claim 9 wherein said synchronization information necessary for reception comprises a horizontal synchronization pulse.

28. A method for scrambling a composite television video signal as claimed in claim 10 wherein said step of selecting is controlled such that no horizontal synchronization information is selected.

29. A method for scrambling a composite television video signal as claimed in claim 28 wherein following the end of each interval containing video information in said scrambled television signal a different signal is selected for a period of time.

30. A method for scrambling a composite television video signal as claimed in claim 29 wherein said period of time is greater than or essentially equal to the duration separating intervals containing video information in the composite television signal.

31. A method for scrambling a composite television video signal as claimed in claim 29 wherein said period of time is essentially equal to the duration separating intervals containing video information in the composite television signal.

32. A method for scrambling a composite television video signal as claimed in claim 31 wherein multiple selections of signals are made following the end of an interval containing video information of the selected signal.

33. A method for scrambling a composite television video signal as claimed in claim 28 wherein a signal containing digital data is selected at the end of at least some intervals containing video information of the selected signal.

34. A method for scrambling a composite television video has vertical blanking intervals separating such sequence of video information signal as claimed in claim 10 wherein said step of selecting is controlled such that said scrambled television signal contains only intervals containing video information of the composite television signal and portions of the intervals containing video information of the composite television signal between vertical blanking intervals.

35. A method for scrambling a composite television video signal as claimed in claim 34 wherein said portions comprise leading and trailing portions of intervals containing video information.

36. A method for scrambling a composite television video signal as claimed in claim 9 wherein the maximum duration of any said interval separating intervals containing video information in said scrambled television signal essentially equals the maximum time difference between each of said selected signals and the composite television signal plus the duration of the intervals separating the intervals containing video information in the composite television signal.

37. A method for scrambling a composite television video signal as claimed in claim 9 wherein said processing comprises passing the composite television signal according to said predetermined scheme through shifting means having at least two channels with at least one non-zero time shift value greater than or equal to the duration of a horizontal synchronization pulse and combining the signals output from said channels to produce said scrambled television signal.

38. A method for scrambling a composite television video signal as claimed in claim 37 wherein said shifting means has a zero time shift value and at least one non-zero time shift value.

39. A method for scrambling a composite television video signal as claimed in claim 37 wherein the time at which the composite television signal is passed to a channel of said shifting means for shifting by a non-zero amount of time preceeds the time at which said shifted signal is to be combined to produce said scrambled television signal by a duration equal to said non-zero amount of time.

40. A method for scrambling a composite television video signal as claimed in claim 37 wherein only one signal from said channels at any time effects said scrambled television signal.

41. A method for scrambling a composite television video signal as claimed in claim 37 wherein the composite television signal is passed to at least two channels of said shifting means for shifting by two different amounts of time simultaneously for a period of time when the duration of an interval separating intervals containing video information in said scrambled television signal is to be made greater than or equal to the duration of the intervals separating intervals containing video information in the composite television signal.

42. A method for scrambling a composite television video signal as claimed in claim 41 wherein said period of time equals the amount by which the duration of the interval in said scrambled television signal separating intervals containing video information is made greater.

43. A method for scrambling a composite television video signal as claimed in claim 37 wherein no composite television signal is passed to any channel of said shifting means for a period of time when the duration of an interval separating intervals containing video information in said scrambled television signal is to be made less than the duration of the intervals separating intervals containing video information in the composite television signal.

44. A method for scrambling a composite television video signal as claimed in claim 43 wherein said period of time equals the amount by which the duration of the interval separating intervals containing video information in said scrambled television signal is made less.

45. A method for scrambling a composite television video signal as claimed in claim 37 wherein the order of the sequence of lines of video information in said scrambled television signal essentially equals the order of the sequence of lines of video information in the composite television signal.

46. A method for scrambling a composite television video signal having a sequence of augmented picture portions including a back porch and a line of video information separated by intervals having a front porch and a horizontal synchronization pulse, the method comprising processing the composite television signal to produce a scrambled television signal containing essentially all the augmented picture portions of the composite television signal and omitting at least some of the horizontal synchronization pulses of the composite television signal, wherein at least some of the augmented picture portions in said scrambled television signal are separated by intervals having a duration less than the duration of the intervals separating the augmented picture portions of the composite television signal, wherein said processing is accomplished by shifting in time according to a predetermined scheme at least some portions of the augmented picture portions of the composite television signal, wherein said step of shifting is controlled to allow said scrambled television signal to be subsequently processed to provide a signal substantially corresponding to the composite television video signal by shifting of the video information and creating and inserting the necessary synchronization information omitted during scrambling of the signal.

47. A method for scrambling a composite television video signal as claimed in claim 46 wherein said processing comprises producing from the composite television signal at least one signal corresponding to the composite television signal and having a time shift relative to the composite television signal of a duration at least substantially equal to the duration of a horizontal synchronization pulse, successively selecting according to said predetermined scheme one of the composite television signal and said at least one corresponding signal and combining said selected signals to produce said scrambled television signal.

48. A method for scrambling a composite television video signal as claimed in claim 46 wherein the augmented picture portions include a colour burst portion and said scrambled television signal contains essentially all of said colour burst portions.

49. A method for scrambling a composite television video signal as claimed in claim 46 wherein the augmented picture portions include a colour burst portion and wherein essentially all the back porches and colour burst portions in said scrambled signal are shifted to a grey level.

50. A method for scrambling a composite television video signal as claimed in claim 47 wherein said step of selecting is controlled such that the time of essentially all changes to another selected signal occurs outside the time period in which an augmented picture portion in said scrambled television signal is being derived.

51. A method for scrambling a composite television video signal as claimed in claim 47 wherein said step of selecting is controlled such that no portion of the composite television signal and said at least one corresponding signal containing a front porch and a horizontal synchronization pulse is selected and following the end of an augmented picture portion of the selected signal a different signal is selected for a period of time and wherein said period of time is equal to the sum of the duration of a front porch and a horizontal synchronization pulse of the composite television signal when the next following signal containing an augmented picture portion is the same as said prior selected signal containing said end of the augmented picture portion.

52. A method for scrambling a composite colour television video signal having a plurality of fields containing a sequence of augmented picture portions of fixed duration consisting of a back porch followed by a colour burst portion followed by a line of video information and separated by intervals of fixed duration consisting of a front porch and a horizontal synchronization pulse, the method comprising selecting according to a predetermined scheme either the composite television signal or a corresponding version thereof delayed in time relative to the composite television signal by a duration essentially equal to the sum of the duration of the front porch and the horizontal synchronization pulse and combining said selected signals to form a scrambled television signal containing essentially all of the augmented picture portions of the composite television signal, wherein essentially all of the front porches and horizontal synchronization pulses of the composite television signal are omitted in said scrambled television signal, wherein some adjacent augmented picture portions in said scrambled television signal are separated by intervals having a duration of zero and some adjacent augmented picture portions in said scrambled television signal are separated by intervals having a duration essentially equal to the sum of the duration of a front porch and a horizontal synchronization pulse and the remaining adjacent augmented picture portions in said scrambled television signal are separated by intervals having a duration essentially equal to two times the sum of the duration of a front porch and a horizontal synchronization pulse, and wherein essentially all of the intervals of duration other than zero separating adjacent augmented picture portions in said scrambled television signal consist of portions of the augmented picture portions of the composite television signal.

53. A method of scrambling a composite television video signal having vertical blanking intervals separated by a sequence of lines of video information which are separated by horizontal synchronization intervals each containing a horizontal synchronization pulse, said method comprising shifting in time according to a predetermined scheme to decrease the time duration between at least some portions of the composite signal by an amount at least equal to the duration of a horizontal synchronization pulse and in a manner to eliminate at least some horizontal synchronization pulses, said shifting being controlled such that essentially any shifted portions contain complete lines of video information and no overlap of lines of video information in the scrambled signal occurs, whereby the scrambled signal requires the shifting of at least some of the lines of video information to re-establish the time duration between adjacent video portions to that as essentially found in the composite signal to allow insertion of any necessary horizontal synchronization pulses to effect unscrambling.

54. A method of scrambling a composite television video signal as claimed in claim 53 wherein said shifting is accomplished by selectively passing the composite signal through at least one time delay means to produce the scrambled signal having at least some portions thereof shifted in time and wherein the maximum time shift of any line of video information relative to another line of video information is less than the time duration of one line of video information.

55. A method of scrambling a composite television video signal as claimed in claim 53 including introducing extraneous video information in place of at least some of the horizontal synchronization pulses uneffected by the shifting of lines of video information.

56. A method of scrambling a composite television video signal as claimed in claim 53 wherein the time duration between adjacent vertical blanking intervals in the scrambled signal is the same as that found in the composite television signal.

57. A method of scrambling a composite television video signal as claimed in claim 53 wherein the scrambled signal has a number of horizontal synchronization pulses preceding and following each vertical blanking interval having the same time relation as found in the composite signal to provide timing information used during the unscrambling of the signal.

58. A method of scrambling a composite television video signal as claimed in claim 53 including from time to time inserting digital data into the scrambled signal for portions of the composite signal which need not be transmitted to allow essentially faithful reproduction of the composite signal upon unscrambling.

59. A method of scrambling a composite television video signal as claimed in claim 53 including inserting a control signal in the scrambled signal indicative of the predetermined scheme of scrambling and the commencement thereof.

60. A method of scrambling a composite television video signal as claimed in claim 53 wherein said step of shifting is controlled to provide a time shift between a line of information on one side of a vertical blanking interval and the generally corresponding lines of video information on the other side of such vertical blanking interval which cooperate to produce the image produced on a television screen.

61. A method of scrambling a composite television video signal having intervals containing video information separated by horizontal synchronization pulses the method comprising processing the composite signal to effect removal of the horizontal synchronization pulses from between at least some of the adjacent video information and to shift such adjacent video information relative to each other to at least decrease the time duration therebetween such that video information at least occupies the space from which a horizontal synchronization pulse has been removed.

62. A method of scrambling a composite television video signal according to claim 61, wherein the processing of the composite signal includes passing the composite signal on occasion according to a predetermined scheme through time delay means to produce portions of the scrambled signal generally corresponding to the composite signal and having a time shift relative thereto.

63. A method of scrambling a composite television video signal according to claim 62, wherein said predetermined scheme is such that the time shift between a portion of the scrambled signal delayed relative to an adjacent following portion is less than or equal to the time duration of a synchronization pulse and front porch and greater than the time duration of a horizontal synchronization pulse.

64. A method of scrambling a composite television video signal as claimed in claim 61 wherein said processing of the composite signal introduces from time to time extraneous video information in place of the signal which would otherwise separate adjacent video information.

65. A method of scrambling a composite television video signal as claimed in claim 61 wherein the processing of the signal includes passing the signal through time delay means which shift the signal in time approximately 6.35 micro seconds where upon switch from a delayed mode to a mode advanced in time results in the elimination of a portion of the signal between adjacent video information.

66. A method of scrambling a composite television video signal having intervals containing video information separated by horizontal synchronization pulses, the method comprising processing the composite signal to shift according to a predetermined scheme at least some adjacent video information to at least decrease the time duration therebetween by an amount at least substantially equal to the duration of a horizontal synchronization pulse by eliminating a portion of the signal which need not be transmitted to allow at least substantially faithful reproduction of the composite signal upon unscrambling.

67. A method of scrambling a composite television video signal as claimed in claim 66, wherein the eliminated portion includes a horizontal synchronization pulse which due to its predetermined or known repetitive form can be created and inserted in accordance with timing information during unscrambling of the signal.

68. A method of scrambling a composite television video signal as claimed in claim 66, wherein horizontal synchronization pulses and associated front porches are eliminated which due to their predetermined or known repetitive form can be created and inserted in accordance with timing information during unscrambling of the signal.

69. A method of scrambling a composite television video signal as claimed in claim 66, wherein the eliminated portion includes the trailing edge of the preceding video information.

70. A method of scrambling a composite television video signal as claimed in claim 66, wherein the eliminated portion is selected from the group consisting of trailing edge of preceding video information, front porch, the horizontal synchronization pulse, the back porch and a colour burst.

71. A method of scrambling a composite television video signal as claimed in claim 67 including replacing the portion of the signal between at least some of the video information with extraneous video information.

72. A method of scrambling a composite television video signal as claimed in claim 67 wherein said processing of said composite signal effects elimination of at least some horizontal synchronization pulses and replaces the portion of the signal between at least some of the video information with extraneous video information.

73. A method of scrambling a composite television video signal having vertical blanking intervals separating the intervals containing video information as claimed in claim 66 wherein said step of shifting is controlled such that a number of horizontal synchronization pulses precede and a number of horizontal synchronization pulses follow each vertical blanking interval and the time duration thereof remains unchanged for use by a receiver in unscrambling of the signal.

74. An apparatus for unscrambling a scrambled television signal scrambled by eliminating at least some necessary horizontal synchronization information of a predetermined or known repetitive form between adjacent intervals of video information and having at least some intervals of video information shifted according to a predetermined scheme and in a manner to decrease the time duration between at least some adjacent intervals of video information said apparatus comprising means for receiving a scrambled television signal, means for receiving timing information associated with such scrambled signal, means for shifting in time according to a scheme determined by the predetermined scheme and in accordance with the timing information at least some adjacent lines of video information to re-establish the time duration between adjacent lines of video information to that as essentially found in the original television signal and means for creating and inserting in accordance with the timing information synchronization information eliminated during scrambling to produce an unscrambled signal substantially faithful relative to the original composite signal.

75. An apparatus as claimed in claim 74 wherein said creating and inserting means create and insert horizontal synchronization pulses.

76. An apparatus as claimed in claim 74 wherein said means for creating and inserting in accordance with the timing information create and insert front porches and horizontal synchronization pulses preceding lines of video information to produce an unscrambled signal essentially corresponding to the original unscrambled signal.

77. An apparatus as claimed in claim 74 wherein the scrambled television signal has portion thereof which have not been scrambled and wherein said means for receiving timing information comprises means for detecting and locking onto the horizontal synchronization information in the portions of the signal which have not been scrambled.

78. An apparatus as claimed in claim 77 wherein said means for detecting horizontal synchronization information controls a time base generator for determining the time at which horizontal synchronization information is to be inserted into the unscrambled television signal and the time at which portions of the scrambled television signal are to be shifted.

79. An apparatus as claimed in claim 74 wherein the scrambled television signal is accompanied by a modulated audio signal and wherein the scrambled television signal is passed through a demodulator to produce a base band scrambled television signal void of a modulated audio signal.

80. An apparatus as claimed in claim 79 wherein the base band scrambled television signal is unscrambled and subsequently recombined with the modulated audio signal.

81. An apparatus as claimed in claim 74 wherein said shifting means is cascaded with a gain amplifier to compensate for gain variations in said shifting means.

82. An apparatus as claimed in claim 81 including feedback balancing means to compensate for any DC bias level offset in said shifting means and said gain amplifier.

83. An apparatus as claimed in claim 82 including means for periodically injecting a reference signal into the scrambled television signal, sample and hold means for detecting the reference signal and shifted portions thereof, differential amplifier means for detecting any differences between the reference signal and shifted portions thereof and bias level altering means cascaded with said shifting means and responsive to said differential amplifier means to drive the difference between the reference signal and shifted portions thereof towards zero.

84. An apparatus as claimed in claim 83 wherein said sample and hold means comprise a double pole electronic switch with each of the switched poles being connected to a capacitor for holding the voltages established thereon upon the closing of said double pole electronic switch.

85. An apparatus as claimed in claim 84 wherein said differential amplifier means has a large gain value and is phase compensated to prevent oscillations in the feedback balancing means.

86. An apparatus as claimed in claim 85 wherein said feedback balancing means operates in a negative feedback mode.

87. An apparatus as claimed in claim 74 wherein there is encoded in or associated with the scrambled television signal digital information and including means for extracting digital information in the scrambled television signal.

88. An apparatus as claimed in claim 87 wherein said means for extracting digital information in responsive to abrupt transitions in the scrambled television signal between the white level and the black level.

89. An apparatus as claimed in claim 87 wherein said digital information contains information indicative of the predetermined scheme of scrambling and said means for extracting digital information extracts information indicative of the predetermined scheme of scrambling.

90. An apparatus as claimed in claim 87 wherein said digital information contains information indicative of the predetermined scheme of scrambling and addressing information for determining if the unscrambler is authorized to unscramble the television signal and wherein said means for extracting digital information extracts the information indicative of the predetermined scheme of scrambling and addressing information.

91. An apparatus as claimed in claim 87 wherein said digital information is encoded in the last full interval which would normally contain video information immediately preceding the vertical blanking interval and an interval in the vertical blanking interval and wherein said means for extracting digital information is responsive to only information in the last full interval which would normally contain video information immediately preceding the vertical blanking interval and an interval in the vertical blanking interval.

92. An apparatus as claimed in claim 87 wherein said digital information contains addressing information for determining if the unscrambler is authorized to unscramble the television signal and including static register means for holding information uniquely identifying said unscrambler, and comparing means, whereby the addressing information is compared with the information held in the static register means for determining a match thereby allowing the unscrambler to recognize further addressing information specific to the identified scrambler.

93. An apparatus as claimed in claim 92 wherein said means for enabling said unscrambler comprises a microprocessor.

94. An apparatus as claimed in claim 74 including means for determining if said received signal is not scrambled and means for bypassing said shifting means responsive to said means for determining if said received signal is not scrambled.

95. An apparatus as claimed in claim 74 including a pseudo random number generator responsive to received signals indicative of the predetermined scheme of scrambling to produce an output signal for controlling shifting of portions of the scrambled television signal.

96. An apparatus as claimed in claim 95 wherein said pseudo random number generator is an algorithm implemented in a suitably programmed microprocessor.

97. An apparatus as claimed in claim 74 wherein said means for producing horizontal synchronization information is a two level controlled voltage source responsive to said received timing information.

98. An apparatus as claimed in claim 97 wherein one level of said controlled voltage source corresponds to the voltage level of a front porch in a composite television signal and the other level of said control voltage source corresponds to the level of the tip of a horizontal synchronization pulse in a composite television signal.

99. An apparatus as claimed in claim 98 wherein said two level controlled voltage source has an output which is combined with shifted portions of the scrambled television signal.

100. An apparatus as claimed in claim 99 wherein there is a brief overlapping period of time in which the voltage delivered by the controlled voltage source and the shifted portions of the scrambled television signal are combined to prevent switching transients appearing in the unscrambled television signal.

101. An apparatus as claimed in claim 100 wherein the two level controlled voltage source is controlled to provide a first voltage level corresponding to the level of a front porch in a composite television signal at the time at which the front porch would appear in a composite television signal and is controlled to provide a second voltage level corresponding to the level of the tip of a horizontal synchronization pulse in a composite television signal at the time at which the tip of a horizontal synchronization pulse would appear in a composite television signal.

102. An apparatus as claimed in claim 74 wherein said shifting means comprise digitally controlled analogue shift register means.

103. An apparatus as claimed in claim 102 wherein said digitally controlled analogue shift register means comprise at least one charge coupled device having 91 elements and clocked at a frequency of approximately 14.31 MHz.

104. An apparatus as claimed in claim 74 wherein said shifting means comprises delay means to produce at least one signal corresponding to the scrambled television signal and having a time shift relative thereto and selecting means for selecting according to a scheme determined by the predetermined scheme of scrambling one of the scrambled television signal and said at least one corresponding signal.

105. An apparatus as claimed in claim 104 wherein said selecting means comprises an electronic multiple pole switch having each switched pole thereof electrically connected to one of the scrambled television signal and said at least one corresponding signal.

106. An apparatus for unscrambling a scrambled television signal wherein a number of lines of video information have been shifted according to a predetermined scheme to decrease the time duration between at least some adjacent lines of video information by an amount at least equal to the duration of a horizontal synchronization pulse, said apparatus comprising means for receiving a scrambled television signal, means for receiving timing information associated with such scrambled signal, means for shifting in time according to a scheme determined by the predetermined scheme and in accordance with the timing information at least some adjacent lines of video information to re-establish the time duration between adjacent lines of video information to that as essentially found in the original television signal and means for creating and inserting in accordance with the timing information horizontal synchronization information eliminated during scrambling.

107. An apparatus as claimed in claim 106 including means for creating and inserting in accordance with the timing information any necessary horizontal synchronization pulses.

108. An apparatus as claimed in claim 106 including means for creating and inserting in accordance with the timing information horizontal synchronization pulses preceding lines of video information to produce an unscrambled signal generally corresponding to the original unscrambled signal.

109. A method of unscrambling a scrambled composite television video signal wherein a number of lines of video information have been shifted according to a predetermined scheme to decrease the time duration between at least some adjacent lines of video information by an amount at least equal to the duration of a horizontal synchronization pulse thereby eliminating a substantial portion of the signal between adjacent lines of video information, said method comprising receiving such scrambled television signal, receiving timing information associated with such scrambled signal, shifting in time according to a scheme determined by the predetermined scheme and in accordance with the timing information at least some adjacent lines of video information to re-establish the time duration between adjacent lines of video information to that as essentially found in the original television signal.

110. A method of unscrambling a scrambled television signal as claimed in claim 109 wherein the scrambled signal has at least some horizontal synchronization pulses eliminated, said method including creating and inserting in accordance with the timing information any necessary horizontal synchronization pulses between adjacent lines of video information.

111. A method of unscrambling a scrambled television signal as claimed in claim 110 wherein said shifting is accomplished by selectively processing according to the scheme determined by the predetermined scheme various portions of the scrambled signal through time delay means whereby the unscrambled signal is delayed in time relative to the original signal by an amount greater than or equal to the maximum period any interval in the composite television signal was shifted to produce the scrambled television signal.

112. A method of unscrambling a scrambled television as claimed in claim 110 wherein each interval containing video information in the scrambled television signal is shifted by an amount equal to a fixed amount of time less the actual period of time the interval containing video information in the composite television signal was shifted to produce the scrambled television signal.

113. A method of unscrambling a scrambled television signal having periodically injected accurate frequencies therein as claimed in claim 110 wherein timing information is received by detecting the accurate frequencies to provide a time base to control the time at which portions of the scrambled television signal are shifted.

114. A method of unscrambling a scrambled television signal having periodically injected control signals indicative of the scheme in which the scrambled television signal was scrambled as claimed in claim 109 including receiving said periodically injected control signals and deriving therefrom the scheme in which portions of the scrambled television signal are shifted.

115. A method of unscrambling as claimed in claim 110 wherein the scrambled signal has predetermined portions thereof which have not been scrambled to thereby encode timing information in the scrambled signal, such that timing information is obtained during unscrambling by detecting and locking onto the predetermined portions.

116. A method of unscrambling as claimed in claim 110 wherein said received television signal is accompanied by a modulated audio signal, said method including demodulating the received signal to produce a base band scrambled television signal void of a modulated audio signal.

117. A method of unscrambling as claimed in claim 110 wherein said shifting is accomplished by selectively processing the signal through time delay means and compensating for gain variations of the time delay means.

118. A method as claimed in claim 117 including providing a feedback balancing signal to compensate for any D.C. bias level offset caused by the shifting and the gain variation compensation.

119. A method as claimed in claim 118 including periodically injecting a reference signal into the scrambled television signal, sampling and holding the reference signal and shifted positions thereof, detecting any differences between the reference signal and shifted portions thereof and altering the bias level of at least one of the detected signals to drive the detected differences towards zero.

120. A method of unscrambling as claimed in claim 119 wherein said sampling and holding includes a double pole electronic switch with each of said switch poles being connected to a capacitor for holding the voltages established thereon upon the closing of said double pole electronic switch.

121. In a scrambled television transmission system having a transmitting end at least one receiving end, a method of scrambling a composite television video signal having lines containing video information separated by horizontal synchronization pulses, said method of scrambling shifting in time according to a predetermined scheme at least some portions of the composite television signal in a manner to eliminate at least some horizontal synchronization pulses between adjacent lines of video information, in combination with a method of unscrambling by said at least one receiver, said method of unscrambling comprising receiving such scrambled television signal, receiving timing information associated with such scrambled signal, shifting in time according to a scheme determined by the predetermined scheme and in accordance with the timing information at least some adjacent lines of video information to re-establish the time duration between adjacent lines of video information to that as essentially found in the composite television signal and creating and inserting at least any necessary horizontal synchronization information eliminated during scrambling.

122. In a television transmission system which transmits a scrambled composite television video signal, a scrambler for scrambling a composite television signal for transmission and an unscrambler for receiving and unscrambling the scrambled signal, the composite signal having lines of video information separated by horizontal synchronization pulses, said scrambler comprising means for shifting in time some portions of the composite signal, and control means for controlling said shifting means according to a predetermined scheme to produce a scrambled television signal wherein at least some horizontal synchronization pulses between adjacent intervals containing video information have been eliminated while maintaining substantially all of the video information, said unscrambler comprising means for receiving timing information associated with such scrambled signal, means for shifting in time according to a scheme determined by the predetermined scheme and in accordance with the timing information at least some adjacent lines of video information to re-establish the time duration between adjacent lines of video information to that as essentially found in the original television signal.

123. In a television transmission system as claimed in claim 122 wherein said unscrambler includes means for creating and inserting in accordance with timing information any necessary horizontal synchronization pulses.

124. A method of scrambling a composite television video signal having fields with each field having a vertical blanking interval followed by a sequence of lines of video information separated by a front porch, a horizontal synchronization pulse, a back porch and a colour burst portion associated with a given line of video information, said method comprising selectively delaying within a given field portions of the composite television signal by at least one time delay unit equal to or less than the sum of the durations of a front porch, a horizontal synchronization pulse and a back porch and each portion that is delayed including at least one colour burst portion and the associated line of video information to produce a scrambled signal wherein at least some of the horizontal synchronization pulses present in the composite television signal have been eliminated as a result of selectively delaying portions of the signal and the time duration between at least some other lines of adjacent video information has been increased, while maintaining at least substantially all of the lines of video information and associated colour burst portions and the vertical blanking interval, and including timing information to used during the unscrambling of the scrambled signal.

125. The method of scrambling a composite television video signal as claimed in claim 124 wherein the time delay unit is equal to or greater than the duration of a horizontal synchronization pulse.

126. A method of scrambling a composite television video signal having vertical blanking intervals separated by intervals containing lines of video information which are in turn separated by horizontal synchronization pulses said method comprising producing from time to time at least one signal which corresponds to said composite television signal but delayed in time relative thereto and selecting from the composite signal and the at least one delayed signal to alter the time duration between adjacent lines of video information by increasing the spacing when a signal is selected which is delayed in time relative to the portion of the signal immediately preceding the delayed portion and reducing the time duration between adjacent lines of video information when the signal that is selected is advanced in time relative to the immediately preceding portion whereby the time duration between adjacent lines of video information in the composite signal is altered to produce a scrambled television signal wherein the time duration between at least some adjacent lines of video information has been increased or decreased and wherein the value of the reduction in the time duration between such at least some adjacent lines of video information is equal to at least the time duration of a horizontal synchronization pulse.

127. The method of scrambling a composite television video signal as claimed in claim 126 wherein said step of selecting is controlled to eliminate at least the horizontal synchronization pulse between two lines of video information when decreasing the time duration between two adjacent lines of video information.

128. A method of scrambling a composite television video signal as claimed in claim 126 wherein the time duration between adjacent vertical blanking intervals remains unchanged and only the lines of video information and the horizontal synchronization pulses between vertical blanking intervals are scrambled.

129. A method of scrambling a composite television video signal having blanking intervals separated by intervals containing lines of video information which are in turn separated by horizontal synchronization pulses said method comprising processing from time to time a portion of the composite television signal to provide a signal delayed in time relative thereto by an amount at least equal to the duration of a horizontal synchronization pulse to thereby increase the time duration between two adjacent lines of video information or between a vertical blanking interval and an adjacent line of video information, and returning to a signal from a portion delayed relative thereto in a controlled manner to decrease the time duration between the preceding line of video information and the first line of video information of the returned signal to eliminate a horizontal synchronization pulse between such delayed portion and such returned signal.

130. Apparatus for scrambling a composite television video signal having intervals containing video information separated by horizontal synchronization pulses comprising means for shifting in time some portions of the composite television signal and control means for controlling said shifting means according to a predetermined scheme to produce a scrambled television signal in which at least some horizontal synchronization pulses between adjacent intervals containing video information are eliminated while maintaining substantially all of the video information.

131. Apparatus as claimed in claim 130 wherein said shifting means comprise digitally controlled analog shift register means.

132. Apparatus as claimed in claim 131 wherein said digitally controlled analogue shift register means comprises at least one charge coupled device having 91 elements and clocked at a frequency of approximately 14.31 MHz.

133. Apparatus as claimed in claim 130 wherein said shifting means comprises delay means to produce at least one signal corresponding to the composite television signal and having a time shift relative thereto and selecting means for selecting according to said predetermined scheme one of the composite television signal and said at least one corresponding signal.

134. Apparatus as claimed in claim 130 including feedback balancing means for compensating for any bias level offsets introduced by said digitally controlled analogue shift register means.

135. Apparatus as claimed in claim 130 including means for inserting digital data into the scrambled television signal representative of the predetermined scheme by which the television signal is scrambled.

136. A method of scrambling a composite television signal having intervals containing video information separated by intervals containing synchronization information necessary for faithful reproduction by a television and of a predetermined or known repetitive form, said method comprising processing the signal to eliminate at least some of the synchronization information necessary for faithful reproduction by a television between adjacent video information and shifting such adjacent video information to decrease the time duration therebetween by a duration substantially equal to the duration of the eliminated necessary synchronization information, which, due to its predetermined or known repetitive form can be created and inserted during unscrambling as required to allow substantially faithful reproduction of the composite signal.

137. A method as claimed in claim 136 wherein said step of shifting is controlled to maintain the order and integrity of substantially all of the video information and horizontal synchronization information is eliminated.

138. A method as claimed in claim 136 wherein the signal is processed to eliminate at least some horizontal synchronization pulses.

139. A method of scrambling a composite signal as claimed in claim 136 wherein the shifting of video information is controlled to retain a portion of the signal from which timing information can be derived.

140. Apparatus for scrambling a composite television video signal having intervals containing video information separated by intervals containing synchronization information necessary for faithful reproduction by a television and of a predetermined or known repetitive form, said apparatus comprising means for processing the signal to eliminate at least some of the synchronization information necessary for faithful reproduction by a television between adjacent video information and means for shifting such adjacent video information to decrease the time duration therebetween by a duration substantially equal to the duration of the eliminated necessary synchronization information, which, due to its predetermined or known repetitive form can be created and inserted during unscrambling as required to allow substantially faithful reproduction of the composite video signal.

141. Apparatus as claimed in claim 140 including means for controlling said shift means whereby horizontal synchronization information is eliminated.

142. Apparatus as claimed in claim 140 wherein said means for processing includes delay means to produce at least one signal corresponding to the composite television signal and having a time shift relative thereto and selecting means for selecting according to said predetermined scheme one of the composite television signal and said at least one corresponding signal.

143. An apparatus for unscrambling a scrambled television signal scrambled by eliminating at least some necessary synchronization information of a predetermined or known repetitive form between adjacent intervals of video information and having at least some intervals of video information shifted according to a predetermined scheme and in a manner to decrease the time duration between at least some adjacent intervals of video information said apparatus comprising means for receiving a scrambled television signal, means for receiving timing information associated with such scrambled signal, means for shifting in time according to a scheme determined by the predetermined scheme and in accordance with the timing information at least some adjacent lines of video information to re-establish the time duration between adjacent lines of video information to that as essentially found in the original television signal and means for creating and inserting in accordance with the timing information synchronization information eliminated during scrambling to produce an unscrambled signal substantially faithful relative to the original composite signal and wherein the scrambled signal includes a control signal indicative of said predetermined scheme and said unscrambler includes means for recognizing the control signal which determines the scheme determined by the predetermined scheme.

144. A method of unscrambling a scrambled television signal scrambed by eliminating at least some necessary synchronization information of a predetermined repetitive form between adjacent intervals of video information and having at least some intervals of video information shifted according to a predetermined scheme and in a manner to decrease the time duration between at least some adjacent intervals of video information said method comprising receiving a scrambled television signal, receiving timing information associated with such scrambled signal, shifting in time according to a scheme determined by the predetermined scheme and in accordance with the timing information at least some adjacent lines of video information to re-establish the time duration between adjacent lines of video information to that as essentially found in the original television signal and creating and inserting in accordance with the timing information synchronization information eliminated during scrambling to produce an unscrambled signal substantially faithful relative to the original composite signal.

145. A method of unscrambling as claimed in claim 144 wherein horizontal synchronization pulses are eliminated during scrambling and are created and inserted during unscrambling.

* * * * *